(12) United States Patent
Daxini et al.

(10) Patent No.: US 10,884,765 B1
(45) Date of Patent: Jan. 5, 2021

(54) OBJECT CONFIGURATION DYNAMIC GRAPHICAL USER INTERFACE

(71) Applicant: Model N, Inc., Redwood City, CA (US)

(72) Inventors: Rinku A. Daxini, Fremont, CA (US); Wilson Lau, Kowloon (HK); Kavita Waldia, San Jose, CA (US); Victor Yemelianenko, Odessa (UA)

(73) Assignee: Model N, Inc., Redwood City, CA (US)

( * ) Notice: Subject to any disclaimer, the term of this patent is extended or adjusted under 35 U.S.C. 154(b) by 129 days.

(21) Appl. No.: 15/919,146

(22) Filed: Mar. 12, 2018

(51) Int. Cl.
| | |
|---|---|
| *G06F 9/451* | (2018.01) |
| *G06F 3/0484* | (2013.01) |
| *G06F 16/23* | (2019.01) |
| *G06F 16/22* | (2019.01) |
| *G06F 16/2457* | (2019.01) |
| *G06F 3/0481* | (2013.01) |
| *G06F 3/038* | (2013.01) |
| *G06F 17/00* | (2019.01) |

(52) U.S. Cl.
CPC ............ *G06F 9/451* (2018.02); *G06F 3/0484* (2013.01); *G06F 16/2282* (2019.01); *G06F 16/23* (2019.01); *G06F 16/2457* (2019.01); *G06F 3/038* (2013.01); *G06F 3/0481* (2013.01); *G06F 3/04842* (2013.01)

(58) Field of Classification Search
CPC ...... G06F 17/24; G06F 17/243; G06F 17/245; G06F 8/71; G06F 3/0489; G06F 9/451; G06F 16/2457; G06F 16/23; G06F 16/2282; G06F 3/0484; G06F 3/038; G06F 3/0481; G06F 3/04842; G06N 99/005; G06N 5/00; G06N 5/003; H04L 67/10; H04L 67/98; H04L 67/16; H04L 41/22

See application file for complete search history.

(56) References Cited

U.S. PATENT DOCUMENTS

| | | | |
|---|---|---|---|
| 2006/0112123 A1* | 5/2006 | Clark | .................... G06F 17/246 |
| 2008/0046462 A1* | 2/2008 | Kaufman | ................ G06F 16/26 |

* cited by examiner

*Primary Examiner* — Quoc A Tran
(74) *Attorney, Agent, or Firm* — Patent Law Works LLP

(57) ABSTRACT

An object configuration graphical user interface including a set of configurable objects in a content region. A first configurable object in the set of configurable objects having a first set of object properties, a first property in the first set of object properties is a first configurable controlling property, the first configurable controlling property is correlated with a plurality of sets of object properties whose availability are dynamically controlled by the first configurable controlling property; receiving, at an input device coupled to the display device, a first user input configuring the first configurable controlling property; setting, responsive to receiving the first user input, the first configurable controlling property to a first configurable value, the first configurable value is correlated with a particular set from the plurality of sets of object properties of the first configurable object; and updating, responsive to the first user input, the object configuration graphical user interface displayed on the display device to depict the second set of object properties in a position that visually associates the second set of object properties with the first configurable object.

20 Claims, 20 Drawing Sheets

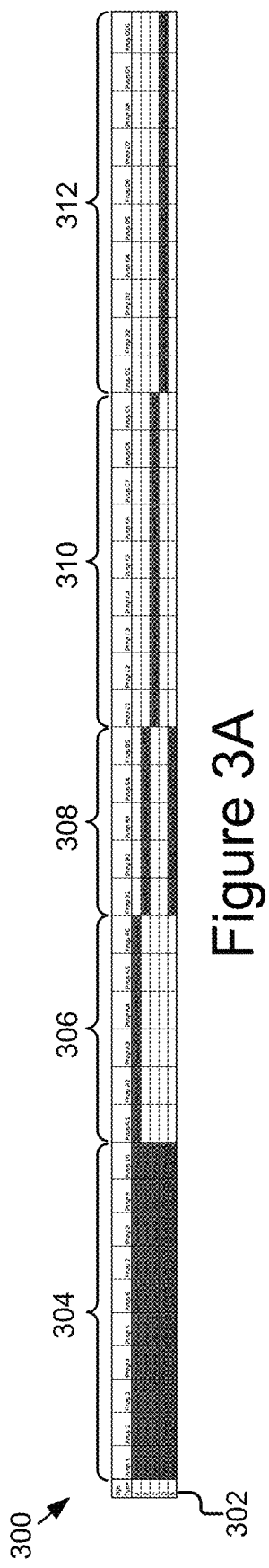

Figure 3A

| Obj Type | Prop 1 | Prop 2 | Prop 3 | Prop 4 | Prop 5 | Prop 6 | Prop 7 | Prop 8 | Prop 9 | Prop 10 | Prop A1 | Prop A2 |
|---|---|---|---|---|---|---|---|---|---|---|---|---|
| A | Value 1-1 | Value 2-1 | Value 3-1 | Value 4-1 | Value 5-1 | Value 6-1 | Value 7-1 | Value 8-1 | Value 9-1 | Value 10-1 | Value A1-1 | Value A |
| B | Value 1-2 | Value 2-2 | Value 3-2 | Value 4-2 | Value 5-2 | Value 6-2 | Value 7-2 | Value 8-2 | Value 9-2 | Value 10-2 | | |
| C | Value 1-3 | Value 2-3 | Value 3-3 | Value 4-3 | Value 5-3 | Value 6-3 | Value 7-3 | Value 8-3 | Value 9-3 | Value 10-3 | | |
| D | Value 1-4 | Value 2-4 | Value 3-4 | Value 4-4 | Value 5-4 | Value 6-4 | Value 7-4 | Value 8-4 | Value 9-4 | Value 10-4 | | |
| B | Value 1-5 | Value 2-5 | Value 3-5 | Value 4-5 | Value 5-5 | Value 6-5 | Value 7-5 | Value 8-5 | Value 9-5 | Value 10-5 | | |

OBJECT CONFIGURATION DYNAMIC GRAPHICAL USER INTERFACE

TECHNICAL FIELD

The present disclosure relates to object configuration.

BACKGROUND

The configuration of objects with differing sets of properties in a single, unified graphical user interface (GUI) can be visually difficult and cumbersome to work with due to the sheer number of columns in a table where the rows correspond to configurable objects, and the columns correspond to properties of the configurable objects. A single configurable object type may have many properties. Scrolling through the columns corresponding to those properties on a display screen for reading, entering, or editing the properties of the configurable object can be taxing on the user, requiring excessive scrolling or paging, and often lead to abandonment or underutilization of the software program.

When there are many configurable objects of different types in a table, and when each configurable object type has a different set of properties, the table displaying those different configurable object types must have at least a column for every unique property type across all types of the configurable objects. In such a table, most of the columns may be empty—creating a sparsely populated table, where most columns in the table do not apply to any particular type of configurable object. Most of the cells in such a table will be empty, due to most of the cells in that configurable object's row corresponding to properties of different types of configurable objects.

In many cases, when most of an object's property cells are empty for most objects, more horizontal scrolling is required to interact with the few non-empty cells that are the cells of interest for that object type. Furthermore, some object types may have properties in common with some other object types—but not all object types. In such cases, the properties for a given object type may be scattered across the columns of the table of objects in multiple clusters of relevant properties. Scrolling horizontally to different sections of the table to view, enter, and edit property values wastes time in locating/navigating to the fields of interest. Such a table makes reading the data in the table less intuitive and creates more opportunities for distraction and error—both in data entry/modification and in viewing and assimilating data presented by the table.

Some solutions provide a tab-based interface that selectively shows each of the columns. However, some tab-based solutions make it difficult to see all objects at once, to compare the common fields of different object types, and to sort across all object types in a single view—by object creation date, across all object types, for example.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, which includes displaying, on a display device, an object configuration graphical user interface including a set of configurable objects in a content region. A first configurable object in the set of configurable objects having a first set of object properties, a first property in the first set of object properties is a first configurable controlling property, the first configurable controlling property is correlated with a plurality of sets of object properties whose availability are dynamically controlled by the first configurable controlling property; receiving, at an input device coupled to the display device, a first user input configuring the first configurable controlling property; setting, responsive to receiving the first user input, the first configurable controlling property to a first configurable value, the first configurable value is correlated with a particular set from the plurality of sets of object properties of the first configurable object; and updating, responsive to the first user input, the object configuration graphical user interface displayed on the display device to depict the second set of object properties in a position that visually associates the second set of object properties with the first configurable object. Other embodiments of this aspect include corresponding computer systems, apparatus, and computer programs recorded on one or more computer storage devices, each configured to perform the actions of the methods.

Implementations may include one or more of the following features. The computer-implemented method where the set of configurable objects includes a table with a row in the table representing the first configurable object. The computer-implemented method where the position is within an expanded content area of the first configurable object, and below the display of the first set of object properties of the first configurable object. The computer-implemented method where, responsive to a second user input, the second set of object properties is hidden. The computer-implemented method where the first user input is a user input from among the following: selection of the first configurable value from a list of available values for the first configurable value; and typing a typed value for the first configurable value, the typed value matching a member of the list of available values for the first configurable value.

Other implementations may include one or more of the following features. The computer-implemented method further including hiding, responsive to a third user input, the second set of object properties of the first configurable object in the object configuration graphical user interface; and displaying, responsive to the third user input, a third set of object properties, the third set of object properties is associated with a second configurable object. The computer-implemented method where the third user input includes selection of the second configurable object. Implementations of the described techniques may include hardware, a method or process, or computer software on a computer-accessible medium.

BRIEF DESCRIPTION OF THE DRAWINGS

This disclosure is illustrated by way of example, and not by way of limitation in the figures of the accompanying drawings in which like reference numerals are used to refer to similar elements.

FIG. 3A is an illustration of a sparsely-populated data table for configurable objects.

FIG. 3B is a close-up of the first part of a sparsely-populated data table for configurable objects.

FIG. 3C is a close-up of the second part of a sparsely-populated data table for configurable objects.

FIG. 3D is a close-up of the third part of a sparsely-populated data table for configurable objects.

DETAILED DESCRIPTION

Figure 1:
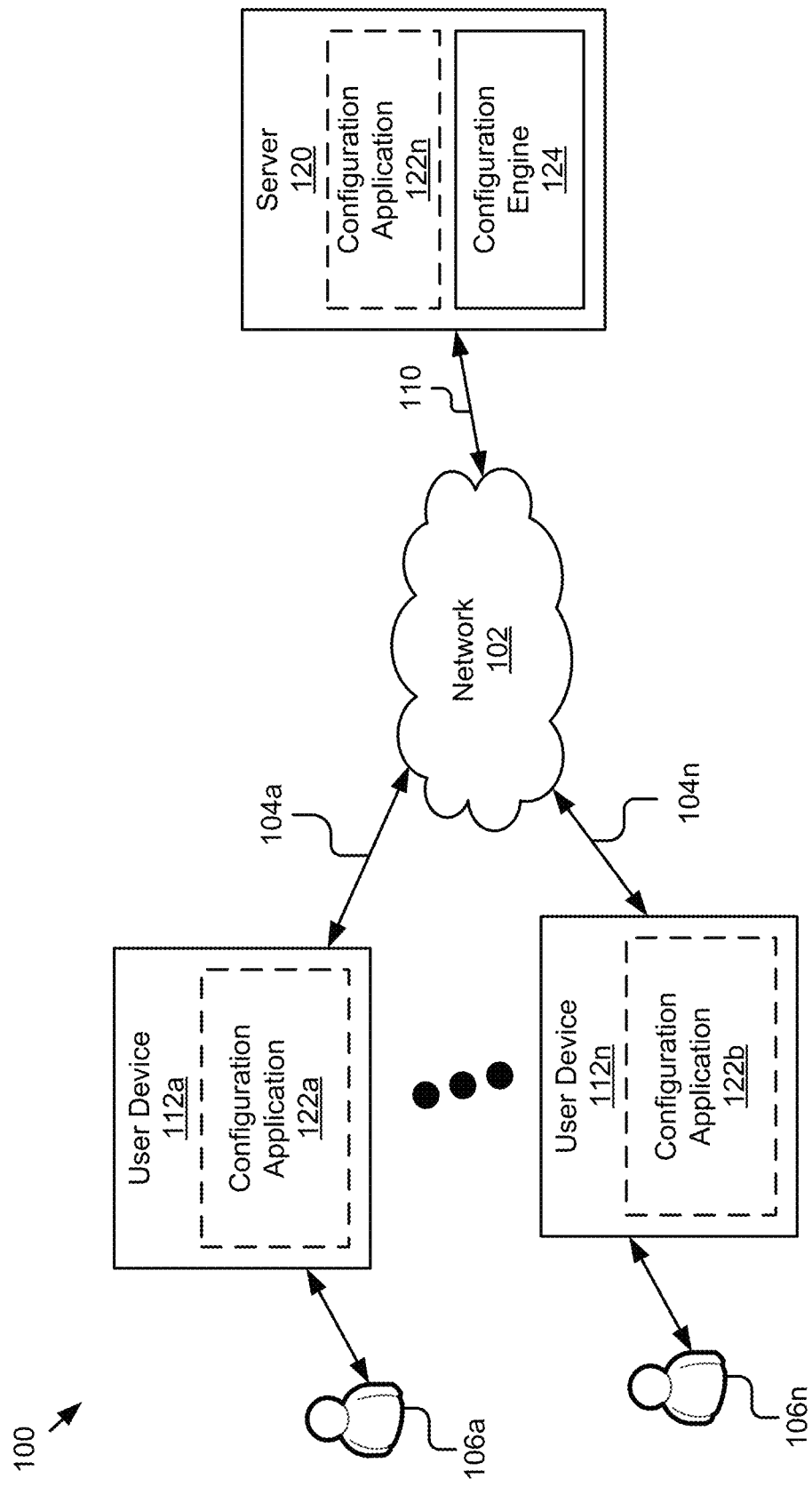
FIG. 1 is a block diagram illustrating an example object configuration system.

FIG. 1 is a block diagram of an example system 100 for customizing content (e.g., a content page including results) based on tag expressions. The illustrated system 100 may include user devices 112a . . . 112n (also referred to herein individually and/or collectively as 112), and an enterprise server 120, which are electronically communicatively coupled via a network 102 for interaction with one another, although other system configurations are possible including other devices, systems, and networks. For example, the system 100 could include any number of user devices 112, enterprise servers 120, and other systems and devices. The user devices 112a . . . 112n, and their components, may be coupled to the network 102 via signal lines 104a . . . 104n, respectively. The enterprise server 120 and its components may be coupled to the network 102 via signal line 110. The users 106a . . . 106n may access one or more of the devices of the system 100. For example, as depicted, user 106a may access the user device 112 in an implementation, and user 106n may access either/both user devices 112a and 112n (e.g., a smartphone and a laptop).

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

A user device 112 includes one or more computing devices having data processing and communication capabilities. In some implementations, a user device 112 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The user device 112 may couple to and communicate with other user devices 112, the enterprise server 120, and the other entities of the system 100 via the network 102 using a wireless and/or wired connection.

Examples of user devices 112 may include, but are not limited to, mobile phones, tablets, laptops, desktops, netbooks, server appliances, servers, virtual machines, TVs, set-top boxes, media streaming devices, portable media players, navigation devices, personal digital assistants, etc. The system 100 may include any number of user devices 112. In addition, the user devices 112 may be the same or different types of computing devices.

The configuration application 122a-122n may be hosted by a computing system (e.g., the enterprise server 120), on the network 102, may be distributed across one or more computing systems (e.g., the enterprise server 120 and a user device 112, user devices 112), etc. The instances of the configuration application 122a . . . 122n may be referred to herein independently and/or collectively as 122. The user devices 112 may store and/or operate other software such as an internet browser, operating system, other applications, etc., that are configured to interact with the enterprise server 120, and/or other elements of the system 100 via the network 102.

In an example, instances including various aspects of the configuration application 122 may be stored and operable on the user devices 112a . . . 112n and the enterprise server 120. In a further example, the user devices 112a and 112n may include client-side instances of the configuration application 122a and 122b, respectively, and the enterprise server 120 may include a server-side instance of the configuration application 122n. In this example, the client-side instances may embody a client application operable generate and display user interfaces displaying a content page generated by the configuration application 122 and/or the configuration application 122, receive and interpret user input, send requests to and receive responses from the other entities of the network 102, facilitate user purchases of configurable objects, etc. A configuration object may include object information such as an object description, the constituent components of the object (e.g., in the case of an electronic product, the electronic and/or mechanical components comprising the product, etc., such as the components from a bill of materials (BOM)), configuration error messages, pricing information, etc.). In a non-limiting example, a configurable object is quite often very complex including hundreds or thousands of components, many of which may conflict if they do not have compatible technical specifications. Many types of configurable objects are contemplated, and configurable objects may have a vast and variable array of configurable attributes/properties. Further examples of objects include digital and/or physical products and/or services, such as, but not limited to, consumer electronics, pharmaceuticals, digital products, complex technical services, etc.

In an example, the client-side instances may be code interpretable by another user application, such as a web browser or a mobile application stored and operable by the user device 112. In an example, the configuration application 122 may reside on one or more servers, such as the enterprise server 120 and the user may interact with the configuration application 122 via an application operable by the user device 112 of the user, such as a web browser or mobile application. Other variations are also possible and contemplated.

The enterprise server 120 may include one or more computing devices having data processing, storing, and communication capabilities. For example, the enterprise server 120 may include one or more hardware servers, server arrays, storage devices and/or systems, etc. In some implementations, the enterprise server 120 may include one or more virtual servers, which operate in a host server environment and access the physical hardware of the host server including, for example, a processor, memory, storage, network interfaces, etc., via an abstraction layer (e.g., a virtual machine manager). In some implementations, the enterprise server 120 may include a web server (not shown), a REST (representational state transfer) service, or other server type, having functionality for satisfying content requests and receiving content from one or more computing devices that are coupled to the network 102 (e.g., the user device 112, etc.).

In the depicted implementation, the enterprise server 120 may include a configuration application 122 and a configuration engine 124. The configuration engine 124 is operable to provide an item configuration interface to configure various configurable objects, such as to configure objects for supply chain management purposes, for designing new products, customizing a product for purchase, etc. The configuration engine 124 may store and provide access to configurable object information (e.g., images, descriptions, options, categories, specifications, reviews, ratings, retailers, etc.) in a data store, such as the data store 208 (e.g., see FIG. 2A). For example, the configuration engine 124 may serve a content (e.g., webpages, structured data, etc.) page customized at least in part by the configuration application 122, and requested by the user devices 112, as discussed in further detail elsewhere herein.

The configuration engine 124 have its own persistence of models representing objects being configured. The configuration engine 124 may be stateful in that it keeps a model in local memory during a configuration session in which a user uses the configuration interface(s) to configure a model and the configuration engine 124 validates the model representing the configuration of the model (e.g., by validating input using applicable rules). A model comprises a customizable instance an object. The state can be reconstructed in a future request. The in-memory model may be parsed and indexed/hashed for better efficiency. The configuration may include a series of layers that provide a reusable and modular architecture. In some cases, the utility of each layer may be accessible via APIs represented by interaction handler 252 of the configuration engine 124.

The APIs includes software and/or logic for accessing various functionality, acts, and/or data provided by the configuration engine 124 and/or its respective components. In some cases, the configuration application 122 validates configuration inputs received via interfaces rendered by it by sending the inputs to the configuration engine 124 for processing by the property manager 254 via the APIs.

The configuration engine 124 may be deployed in an on-demand environment and the APIs may enable access to various acts and/or functionality of the configuration engine 124. In some implementations, the APIs relay requests and responses from the other software applications to the appropriate components of the configuration engine 124 for processing. The requests and responses may contain configuration input, a partial or a full representation of the model, user-identifying information, object-identifying information, etc. Example API methods include GET, POST, PUT, etc., methods for updating the state of an object based on configuration inputs being received, and providing validation feedback (e.g., validation of an input, error showing an input is invalid, etc.).

Various embodiments of the configuration engine 124 are thoroughly described in Applicant's U.S. Pat. No. 9,466,026, which is hereby incorporated by reference herein in its entirety.

The configuration engine 124 may place and provide for order fulfillment for the configurable objects (e.g., computers, storage devices, printers, electronics, accessories, print products, office products, consumer products, online services, home or business services, etc.) including order delivery status and item returns. In an example, a user 106 may place orders for and/or pay for configurable objects, printer materials, other products, consumer or business services, etc., ordered on an e-commerce marketplace using a user device 112.

In some implementations, the configuration engine 124 may include computer logic executable by the processor(s) 204 (e.g., see FIG. 2A) to receive, manage, analyze, store, and provide access to inventory, sales, rewards, and configurable object data and for analyzing the data managed by it to generate analytics and reports for review by management to assess the performance and effectiveness of the enterprise server 120.

In some implementations, the configuration engine 124 and/or configuration application 122 may require users 106 to be registered to access the services/functionality provided by them. For example, to access various services/functionality provided by the configuration engine 124 and/or configuration application 122, they may require a user 106 to authenticate his/her identity (e.g., by confirming a valid electronic address). In some instances, the entities 124 and/or 122 may interact with a federated identity server (not shown) to register/authenticate users 106 and/or user devices 112. Once registered, these entities 124 and/or 122 may require a user 106 seeking access to authenticate by inputting credentials in an associated user interface, and responsive thereto, may set and/or provide authentication tokens, cookies, and/or other identification data for authenticating the identity of the user.

It should be understood that the system 100 illustrated in FIG. 1 is representative of an example system and that a variety of different system environments and configurations are contemplated and are within the scope of the present disclosure. For instance, various functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or additional computing devices or systems, etc.

Figure 2A:
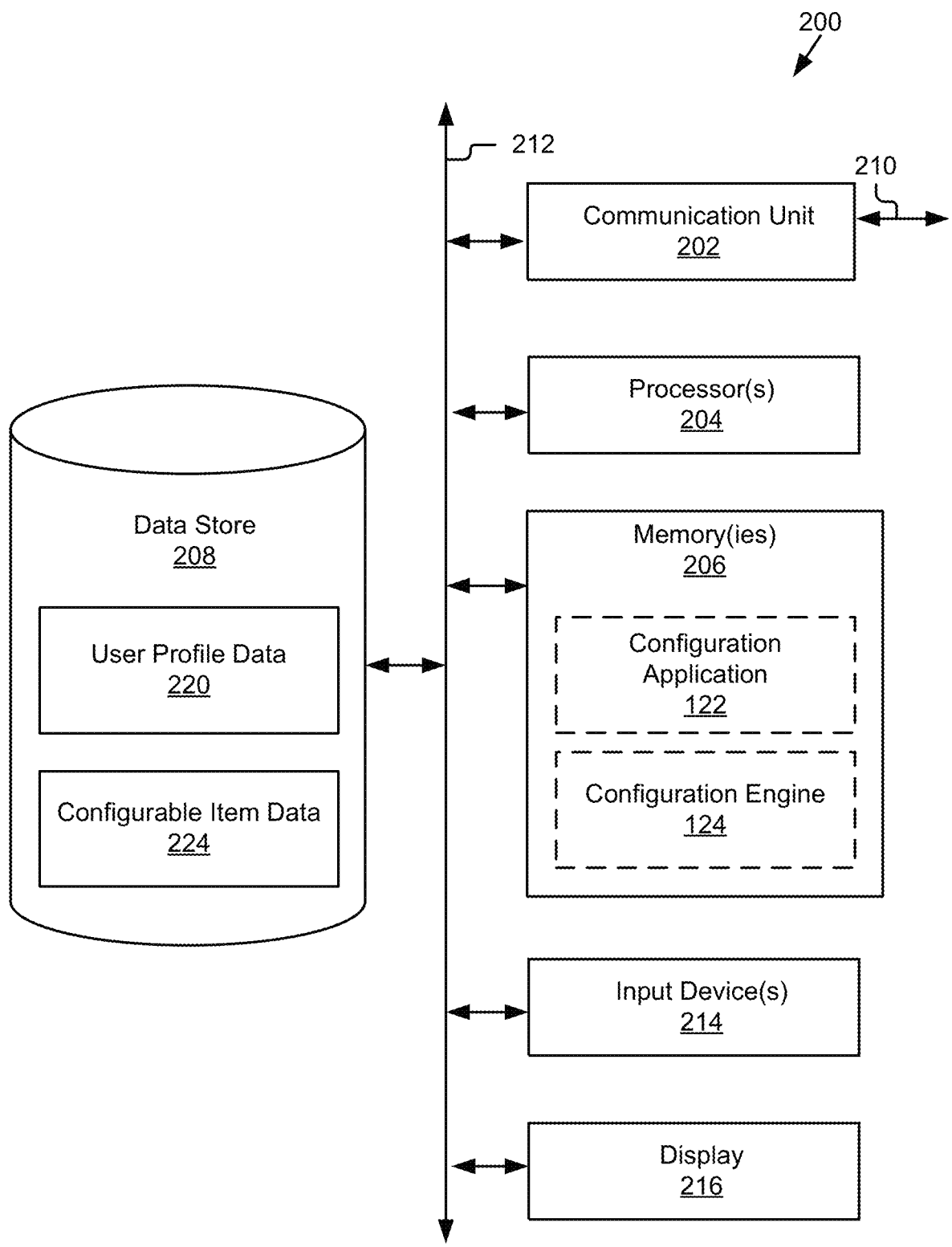
FIG. 2A is a block diagram illustrating an example device or system for object configuration.

FIG. 2A is a block diagram of an example computing system 200. The example computing system 200 may represent the computer architecture of a user device 112, and/or an enterprise server 120, depending on the implementation. As depicted, the computing system 200 may include a processor(s) 204, a memory(ies) 206, a communication unit 202, a data store 208, input device(s) 214, and a display 216, which may be communicatively coupled by a communication bus 212. The computing system 200 depicted in FIG. 2A is provided by way of example, and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations.

The processor(s) 204 may execute software instructions by performing various input, logical, and/or mathematical operations. The processor(s) 204 may have various computing architectures to process data signals including, for example, a complex instruction set computer (CISC) architecture, a reduced instruction set computer (RISC) architecture, and/or an architecture implementing a combination of instruction sets. The processor(s) 204 may be physical and/or virtual, and may include a single core or plurality of processing units and/or cores. In some implementations, the processor(s) 204 may be capable of generating and providing electronic display signals to a display device, supporting the display of images, capturing and transmitting images, performing complex tasks including various types of feature extraction and sampling, etc. In some implementations, the processor(s) 204 may be coupled to the memory(ies) 206 via the bus 212 to access data and instructions therefrom and store data therein. The bus 212 may couple the processor(s) 204 to the other components of the enterprise server 120 including, for example, the memory(ies) 206, the communication unit 202, the input device(s) 214, the display 216, and the data store 208.

The memory(ies) 206 may store and provide access to data to the other components of the computing system 200. The memory(ies) 206 may be included in a single computing device or a plurality of computing devices. In some implementations, the memory(ies) 206 may store instructions and/or data that may be executed by the processor(s) 204. For example, as depicted in FIG. 2A, the memory(ies) 206 may store the configuration application 122, the configuration engine 124, configuration data, object properties, control properties, etc., and their respective components, depending on the configuration. The memory(ies) 206 is also capable of storing other instructions and data, including, for example, an operating system, hardware drivers, other software applications, databases, etc. The memory(ies) 206 may be coupled to the bus 212 for communication with the processor(s) 204 and the other components of computing system 200.

The memory(ies) 206 include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 204. In some implementations, the memory(ies) 206 may include one or more of volatile memory and non-volatile memory. For example, the memory(ies) 206 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory (ies) 206 may be a single device or may include multiple types of devices and configurations.

The bus 212 can include a communication bus for transferring data between components of a computing device or between computing devices, a network bus system including the network 102 or portions thereof, a processor mesh, a combination thereof, etc. In some implementations, the configuration application 122, the configuration engine 124, and various other components operating on the enterprise server 120 (operating systems, device drivers, etc.) may cooperate and communicate via a communication mechanism included in or implemented in association with the bus 212. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity with the network 102 and the other components of the system 100, for example, the user device 112, the enterprise server 120, etc. For instance, the communication unit 202 may include, but is not limited to, CAT-type interfaces; wireless transceivers for sending and receiving signals using Wi-Fi™; Bluetooth®, IrDA™, Z-Wave™, ZigBee®, cellular communications, etc.; USB interfaces; various combinations thereof; etc. The communication unit 202 may include radio transceivers (e.g., 5G+, 4G, 3G, 2G, etc.) for communication with the network 102, and radio transceivers for Wi-Fi™ and close-proximity/personal area (e.g., Bluetooth®, NFC, etc.) connectivity, geo-location transceivers (e.g., GPS) for receiving and providing location information for the corresponding device, and the like. The communication unit 202 may be coupled to the other components of the computing system 200 via the bus 212. The communication unit 202 may be coupled to the network 102 as illustrated by the signal line 210. In some implementations, the communication unit 202 can link the processor(s) 204 to the network 102, which may in turn be coupled to other processing systems. The communication unit 202 can provide other connections to the network 102 and to other entities of the system 100 using various communication protocols, including, for example, those discussed elsewhere herein.

The data store 208 is an information source for storing and providing access to data. The data stored by the data store 208 may be organized and queried using various criteria including any type of data stored by them, such as a user/customer identifier, corporation identifier, organization identifier, configurable object identifier, configurable object name, configurable object category, other configurable object properties, tags, locations, merchant, user device, electronic address, where configurable objects were purchased from, etc. The data store 208 may include data tables, databases, or other organized collections of data. Examples of the types of data stored by the data store 208 may include, but are not limited to, user profile data 220, configuration data 224, etc.

The data store 208 may be included in the computing system 200 or in another computing system and/or storage system distinct from but coupled to or accessible by the computing system 200. The data store 208 can include one or more non-transitory computer-readable mediums for storing the data. In some implementations, the data store 208 may be incorporated with the memory(ies) 206 or may be distinct therefrom. In some implementations, the data store 208 may store data associated with a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

The user profile data 220 describes the users of the system 100. The user profile data 220 includes the user accounts of the users and stores attributes describing the users. Non-limiting examples of user attributes include an e-mail address, IP address, demographic data, user id, account number, configurable object identifier associated with the user (e.g., configured by the user, set up by the user, administered by the user, etc. In some implementations, the user profile data 220 includes information learned from user behavior (e.g., interaction data) through various computer-learning methods, as discussed elsewhere herein. In some implementations, the user profile data 220 includes information provided by a user, such as a username, password, preference data, payment information, etc. In some implementations, the user profile data includes object property defaults set by the user and/or the configuration application 122. The defaults may be loaded automatically when a page is loaded by the configuration application 122, such that certain dynamic properties may automatically be set and available in the interface. Examples include one or more controlling property values set by the user for a certain object or object type, where the automatic loading of those properties further enhanced the usability of the interfaces.

The user profile data 220 may include interaction data tracking current and past interactions with the enterprise server 120 and, in some implementations, other servers (e.g., a third-party server). The interaction data includes history data, which is an aggregation of past behavior of the user. Non-limiting examples of past user behavior include objects the user has configured, changes to objects the user has made, webpages the user 106 has visited, items (e.g., pages, elements on a page, etc.) the user 106 has interacted with (e.g., typed, clicked, hovered over, etc.), Internet searches the user 106 has made, etc.

The input device(s) 214 may include any device for inputting information into the computing system 200. In some implementations, the input device(s) 214 may include one or more peripheral devices. For example, the input device(s) 214 may include a keyboard (e.g., a QWERTY keyboard), a pointing device (e.g., a mouse or touchpad), microphone, an image/video capture device (e.g., camera), etc. In some implementations, the input devices 214 may include a touch-screen display capable of receiving input from the one or more fingers of the user. For instance, the structure and/or functionality of one or more of the input device(s) 214 and the display 216 may be integrated, and a user of the computing system 200 may interact with the computing system 200 by contacting a surface of the display 216 using one or more fingers. In this example, the user could interact with an emulated (i.e., virtual or soft) keyboard displayed on the touch-screen display 216 by using fingers to contact the display in the keyboard regions.

The display 216 may display electronic images and data output by the computing system 200 for presentation to a user 106. The display 216 may include any display device, monitor or screen, including, for example, an organic light-emitting diode (OLED) display, a liquid crystal display (LCD), etc. In some implementations, the display 216 may be a touch-screen display capable of receiving input from one or more fingers of a user 106. For example, the display 216 may be a capacitive touch-screen display capable of detecting and interpreting multiple points of contact with the display surface. In some implementations, the computing system 200 may include a graphics adapter (not shown) for rendering and outputting the images and data for presentation on display 216. The graphics adapter (not shown) may be a separate processing device including a separate processor and memory (not shown) or may be integrated with the processor(s) 204 and memory(ies) 206.

As depicted in FIG. 2A, the computing system 200 may include a configuration application 122 and an configuration engine 124. These components 122 and 124 may be communicatively coupled by the bus 212 and/or the processor(s) 204 to one another and/or the other components 202, 204, and 208 of the computing system 200. In some implementations, one or more of the components 122 and 124 may include computer logic executable by the processor(s) 204 to provide their acts and/or functionality. In any of the foregoing implementations, these components 122 and 124 may be adapted for cooperation and communication with the processor(s) 204 and other components of the computing system 200.

In some embodiments, the configuration application 122 comprises a thin wrapper around the configuration engine 124 that lets it run on a client rather than a server—which is where the configuration engine 124 runs in some embodiments. As such, in some embodiments, referring to the configuration engine 124 functionality also refers to the functionality of the configuration application 122. In some embodiments, the configuration application 122 may perform more or substantially all of the user interface and object configuration processing. Numerous other variations are also possible and contemplated where various acts and/or functionality are divided/shared between the configuration engine 124 and the configuration application 122, such that any suitable native or distributed configuration may be used. In some cases, the configuration engine 124 may run in a cloud environment such as Amazon Web Services. For instance, one or more Node JS instances, along with a load balancer, may provide the configuration engine 124 functionality. However, other software structures and/or configurations are also contemplated.

Figure 2B:
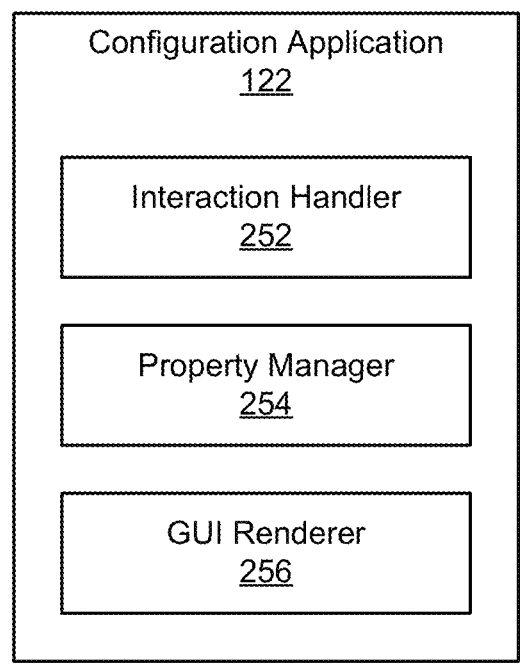
FIG. 2B is a block diagram illustrating an example of a configuration application.
Figure 2C:
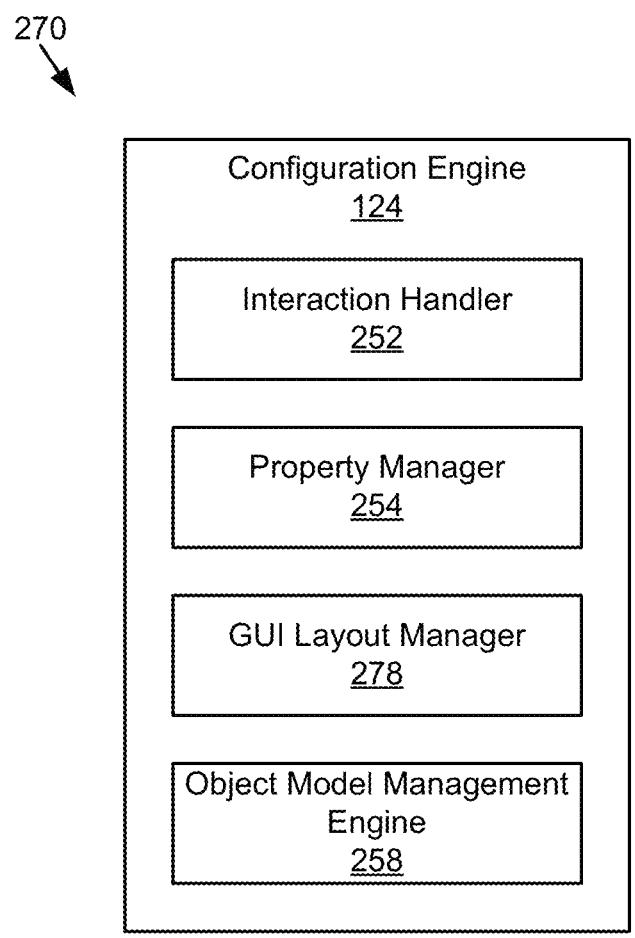
FIG. 2C is a block diagram illustrating an example configuration engine.
Figure 2D:
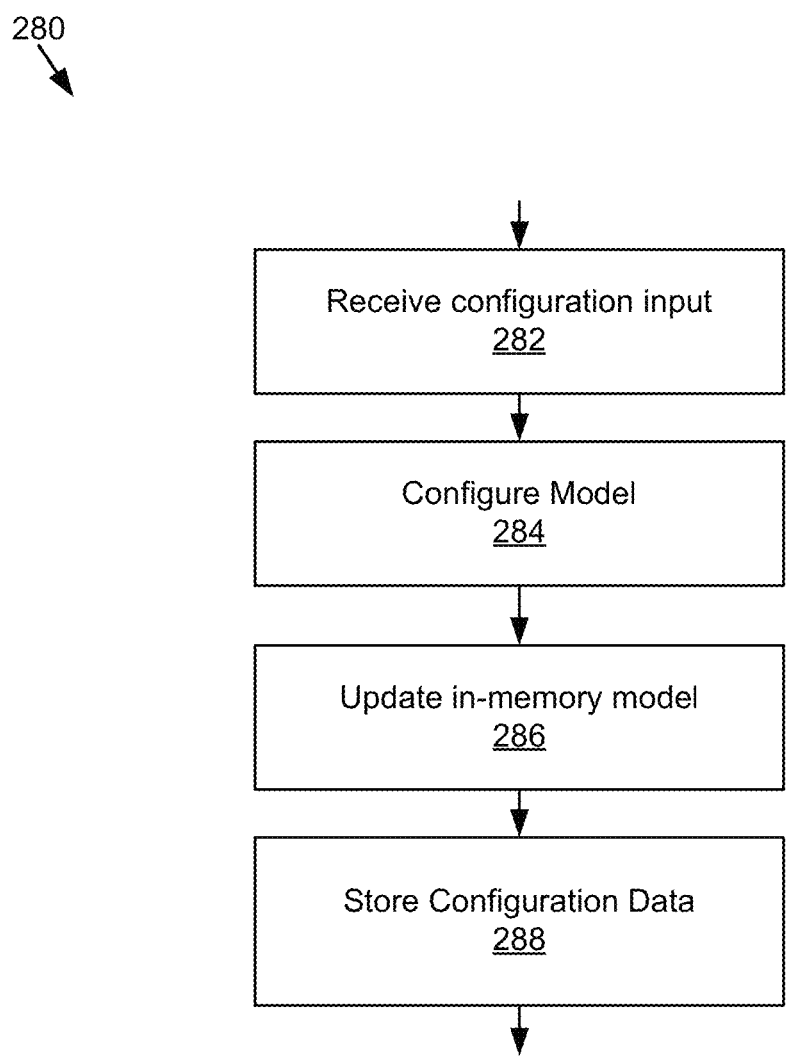
FIG. 2D is a flowchart of an example method for handling received configuration input.

The configuration application 122 is coupled to the configuration engine 124 to exchange information and coupled to the data store 208 to store, retrieve, and/or manipulate data stored therein (see FIG. 2D). Likewise, the configuration engine 124 is coupled to the configuration application 122 to exchange information and coupled to the data store 208 to store, retrieve, and/or manipulate data stored therein (see FIG. 2E).

FIG. 2B is a block diagram 250 of an example configuration application 122. In some embodiments, the configuration application 122 runs on a client device. In some embodiments, it renders a user interface, via which it receives and processes configuration input for its configuration functions. As depicted, the configuration application 122 may include an interaction handler 252, a property manager 254, a GUI renderer 256, and an object model management engine 258.

The components 252, 254, and/or 256 may be communicatively coupled by the bus 212 and/or the processor(s) 204 to one another and/or the other components 202, 204, and 208 of the computing system 200. In some implementations, one or more of the components 252, 254, 256 may include computer logic executable by the processor(s) 204 to provide their acts and/or functionality. In any of the foregoing implementations, these components 252, 254, 256 and/or 258 may be adapted for cooperation and communication with the processor(s) 204 and other components of the computing system 200, such as the data store 208 and/or the memory(ies) 206.

The interaction handler 252 may include computer logic executable by the processor(s) 204 to receive user interactions (e.g., configuration inputs) from a user device 112, determine user identity, and communicate with other components of the configuration application 122 and/or the configuration engine 124. The interaction handler 252 may receive interaction data from the user device 112 and store the interaction data in the data store 208 (e.g., the interaction handler 252 may associate and store the association of the interaction data, such as configuration inputs, with a user profile of the user as user profile data 220 in the data store 208) as user profile data 220 and/or provide the interaction data to the other components of the configuration application 122. The interaction handler 252 may pass requests to other components of the configuration application 122 to instruct the other components to modify and/or use the interaction data to perform their operations.

The GUI renderer 256 may be coupled to the interaction handler 252 to receive user inputs, etc. The GUI renderer 256 may be coupled to the property manager 254 to read and set property values as they are rendered and changed, respectively. In some embodiments, to read and set the property values, the GUI renderer 256 reads and sets the properties in an in-memory model. In some embodiments, the GUI renderer 256 reads and sets the property values directly from/to the data store 208 via the bus 212. In some embodiments, the GUI renderer 256 reads and sets the property values indirectly from/to the data store 208 via the network 102. The property manager 254 may read and store general properties of items and products, and may also read and store more specific properties such as configuration properties of configurable objects.

The GUI renderer 256 may be coupled to any other modules with the configuration application 122 for any data interchange or shared functionality that is required to perform its functions. The GUI renderer 256 may be coupled to the data store 208 to store, retrieve, and/or manipulate data.

The configuration application 122 may be coupled to the configuration engine 124 to exchange information and coupled to the data store 208 to store, retrieve, and/or manipulate data stored therein. Likewise, the configuration engine 124 may be coupled to the configuration application 122 to exchange information and coupled to the data store 208 to store, retrieve, and/or manipulate data stored therein.

FIG. 2C is a block diagram 270 of an example configuration engine 124. In some embodiments, the configuration engine 124 runs on a server. In some embodiments, it provides an API for its configuration functions. As depicted, the configuration engine 124 includes an interaction handler 252, a property manager 254, as in the configuration application 122, as well as a GUI layout manager 278 (as opposed to the GUI renderer 256 of the configuration application 122), and a object model management engine 258.

The components 252, 254, 278, and/or 258 may be communicatively coupled by the bus 212 and/or the processor(s) 204 to one another and/or the other components 202, 204, and 208 of the computing system 200. In some implementations, one or more of the components 252, 254, 256, and/or 258 may include computer logic executable by the processor(s) 204 to provide their acts and/or functionality. In any of the foregoing implementations, these components 252, 254, 256, and/or 258 may be adapted for cooperation and communication with the processor(s) 204 and other components of the computing system 200, such as the data store 208 and/or the memory(ies) 206.

The interaction handler 252 may include computer logic executable by the processor(s) 204 to receive user interactions from a user device 112 and communicate with other components of the configuration application 122 and/or the configuration engine 124. The interaction handler 252 may receive interaction data (such as configuring a configurable object) from the user device 112, pass that data to the property manager 254 which may process some of the data from the interaction through the object model management engine 258 (which may determine whether the configuration is valid or not, and return an error or success indicator). If the configuration as proposed via the user interaction is invalid, then the interaction handler may pass the error to the GUI layout manager 278 to display the error. If the configuration is valid, then the property manager 254 may store the proposed configuration in memory or more persistently, in the data store 208. The interaction handler 252 may pass requests to other components of the configuration engine 124 to instruct the other components to modify and/or use the interaction data to perform their operations.

The property manager 254, as part of the configuration engine 124 or configuration application 122 may be coupled to the interaction handler 252 to receive user inputs (such as changes to a configurable object, or user/application settings). The property manager 254 may be coupled to the GUI layout manager 278 to read and set property values as they are rendered and changed, respectively. The property manager 254 may be coupled to the data store 208 to read and store property values as they are rendered and changed, respectively. The property manager 254 may be coupled to any other modules of the configuration engine 124 for any data interchange or shared functionality that is required to perform its functions. The property manager 254 may be coupled to the data store 208 to store, retrieve, and/or manipulate data.

The GUI layout manager 278 may be coupled to the Interaction Handler 252 to receive user inputs, etc. The GUI layout manager 278 may be coupled to the property manager 254 to read and set property values as they are rendered and changed, respectively. The GUI layout manager 278 may be coupled to any other modules of the configuration engine 124 for any data interchange or shared functionality that is required to perform its functions. The GUI layout manager 278 may be coupled to the data store 208 to store, retrieve, and/or manipulate data.

The object model management engine 258 includes software and/or logic for managing one or more object models. For instance, an object model may include data describing the model including, for example, one or more option groups, rules, products, attributes, options, etc., being configured and/or defined by a user. The object model management engine 258 may be responsible to keep these object models up-to-date based on user configurations associated with the models. By way of example, if a user adds and/or deletes one or more options groups, rules, attributes, etc. to/from a particular model, then the object model management engine may incorporate these changes in the corresponding object model.

In some implementations, the object model management engine 258 may evaluate a model using a modified RETE algorithm. Using this algorithm, the object model management engine 258 may determine all the rules tied to options in the active memory, remove duplicates, and loop over the rules to evaluate them.

FIG. 2D is a flowchart of an example method 280 which may run on the configuration engine 124. As depicted, the configuration engine 124 receives configuration input 282 via the interaction handler 252 and conveys any configuration changes associated with the configuration input 282 to the property manager 254, which configures the model 284 with the received input, updates the in-memory model 286 and stores the configuration data 288 in the datastore 208.

Figure 2E:
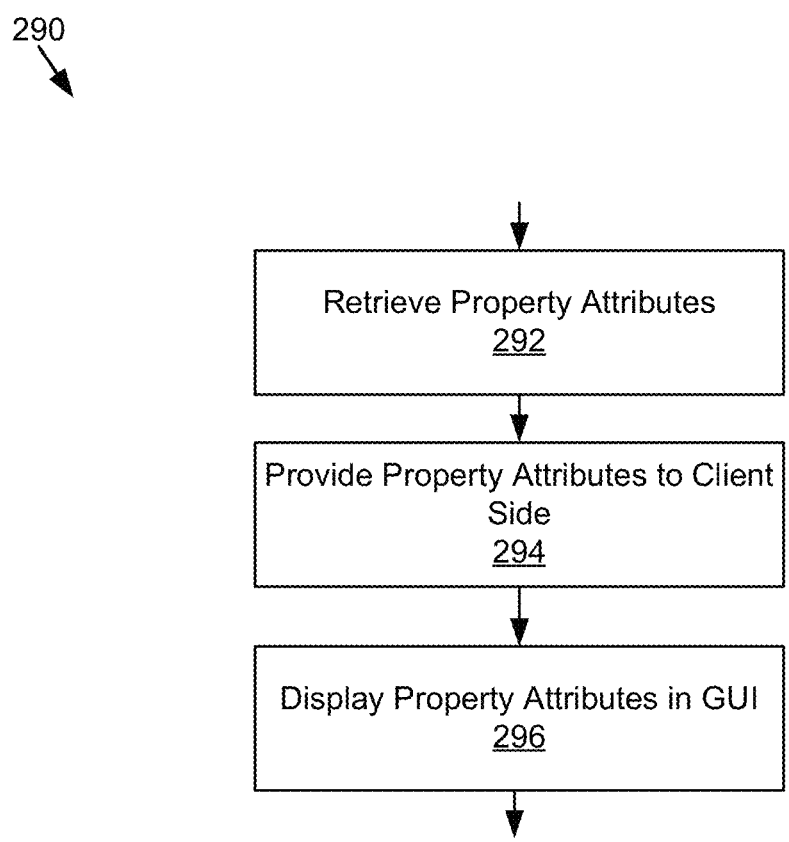
FIG. 2E is a flowchart of an example method for retrieving and displaying property attributes.

FIG. 2E is a flowchart of an example method 290 which may run on the configuration engine 124. As depicted, the property manager 254 retrieves property attributes 292 from the in-memory model or from the data store 208 and provides the property attributes to the client side 294 for layout by the GUI layout Manager 278 or portion of the configuration application 122 for display by the GUI renderer 256.

Figures 3C, 3D:
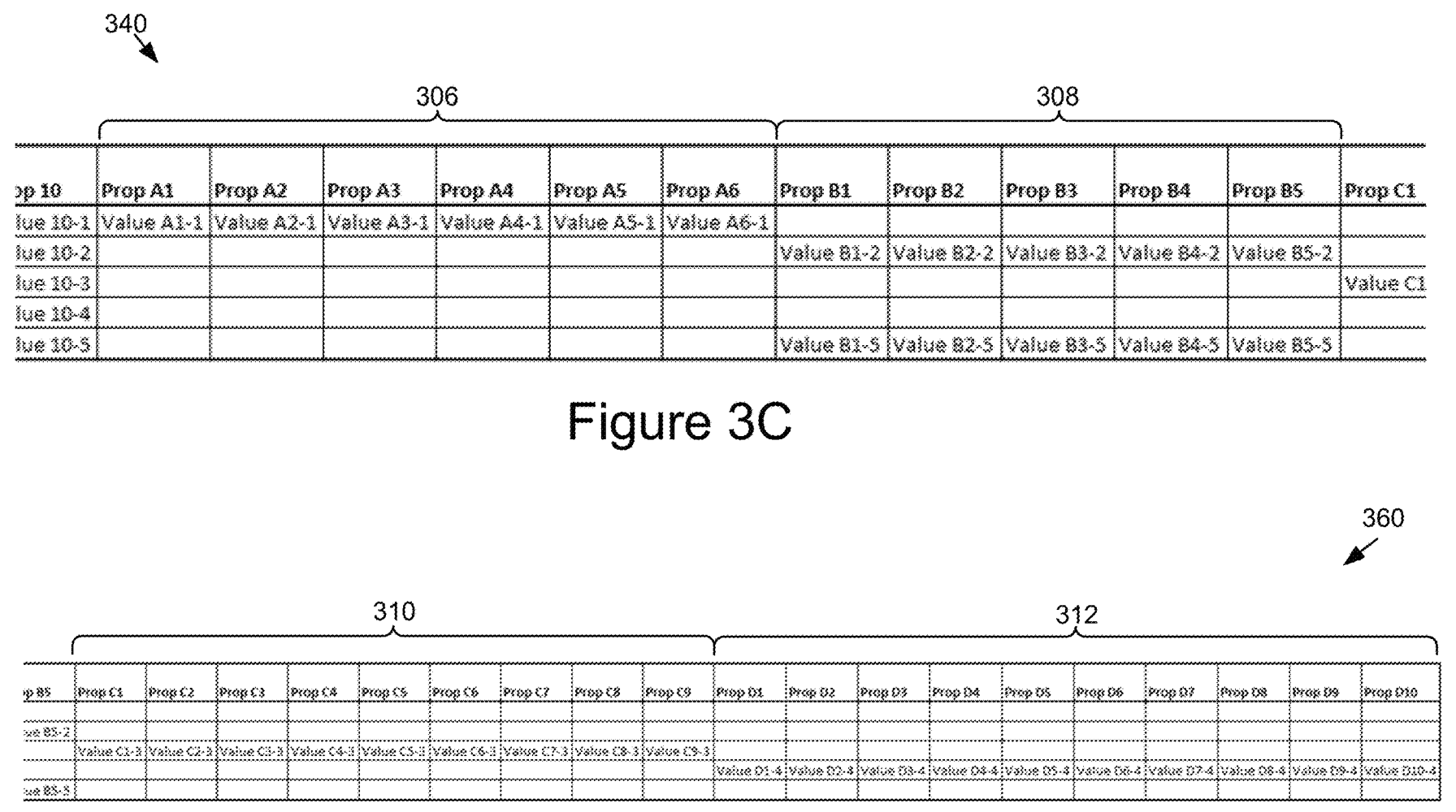

FIG. 3A shows a sparsely-populated table 300. This figure is presented mainly as an overview. The various sections of the table 302-312 are shown in more detail in FIGS. 3B, 3C, and 3D. However, the blacked-out areas in the table 300 show that for even the simple database pictured, only a fraction of the capacity of the table is filled with data, rendering most of the fields (those not blacked out in the figure) blank. As illustrated in FIG. 3A, it is difficult to look at such a sparsely-populated table 300 in its entirety. Furthermore, working with such a table at a reasonable size, where the text could be read and edited would require a great deal of horizontal scrolling, much of the scrolling being through blank cells of the table. A more realistic table representing a real-world database would have hundreds more columns and thousands more rows.

FIG. 3B represents a section 320 of the table 300 in FIG. 3A. The first column in the section 320 represents the object type 302. In some embodiments, objects of different types have some common properties 304 (Prop 1-Prop 10) of the same type as other object types. Each property of each object will have its own value, of course, whether it is a common property, or a property unique to that object type. In some embodiments, some objects may share some property types with some other object types—but not all other object types. In the example shown, there are four different object types: A, B, C, and D. Each of those property types has common properties 304, labeled Prop 1-Prop 10.

FIG. 3C represents the next section 340 of the table 300 from FIG. 3A. Properties labeled Prop A1-Prop A6 are additional properties specific to object type A 306. Properties labeled Prop B1-Prop B6 are additional properties specific to object type B 308. Because only the first row in the table contains an object of object type A, that is the only row in this section 306 with values. In this example, objects not of object type A do not have these properties, and thus the corresponding cells for other object types in the table are blank.

Section 308 of the table section 340, which is part of the table 300, has values in the second and fifth rows of the table. Both the second row and the fifth rows hold objects of object type B, as shown in the column for object type 302. Objects not of object type B do not have these properties, and thus the corresponding cells for other object types in the table are blank.

FIG. 3D shows the rest of the table 300 from FIG. 3A in table section 360. Section 360 of the table 300 contains the additional properties for objects of object type C 310 and object type D 312. As in the other sections of the table, objects not of object type C (for section 310) nor object type D (for section 312) do not have the respective properties, and thus the corresponding cells for the respective other object types in the table are blank.

Collectively, FIGS. 3A-3D show how cumbersome it is to interact with a sparsely populated table 300 that contains object types 302 with different sets of properties 304-312.

Figure 4:
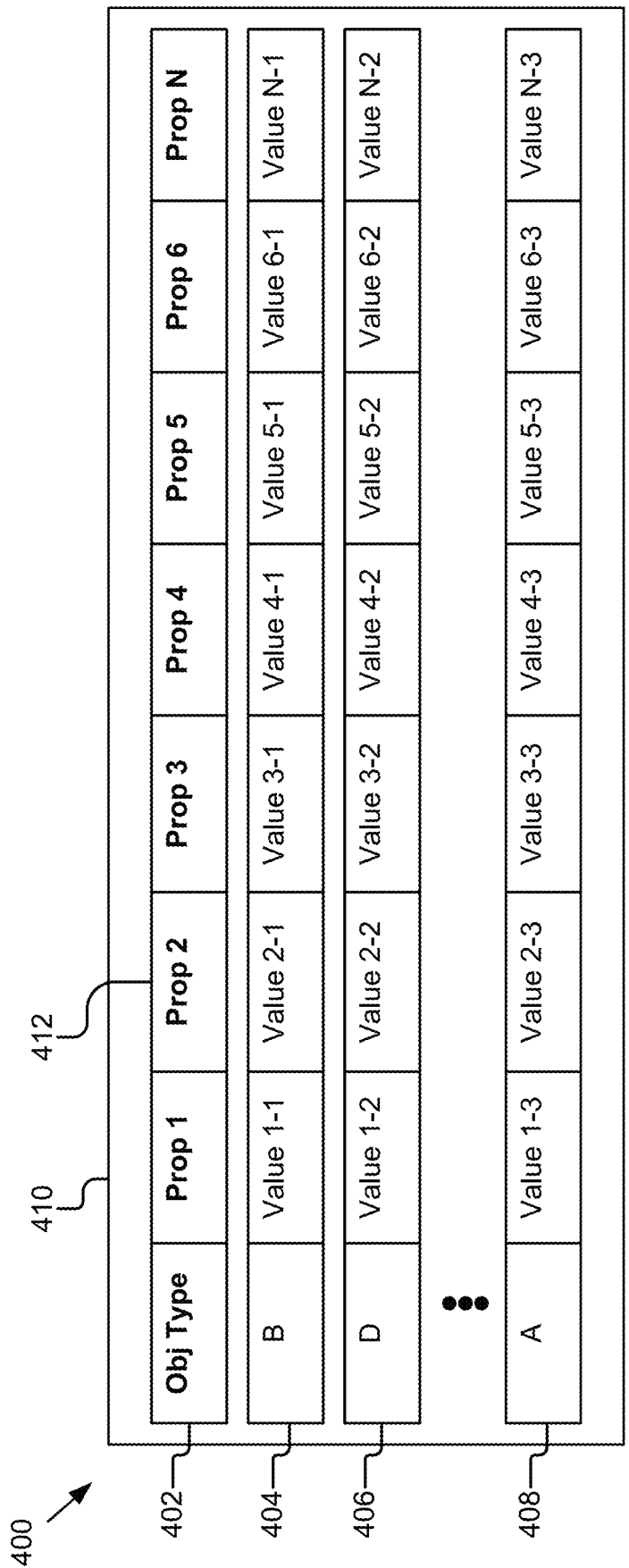
FIG. 4 is a schematic of an example object configuration GUI.

FIG. 4 represents an object configuration user interface 400, generated by the configuration engine 124 or generated and displayed by the configuration application, that addresses some of the problems of working with a large, sparsely-populated table. In some embodiments, an object configuration graphical user interface ("GUI") element 410 comprises a set of a variable number of configurable objects. This example illustrates configurable objects, 404, 406, and some additional number of configurable objects through configurable object 408, with a corresponding row of property labels 402. In this example, configurable object 404 is an object of object type B. Configurable object 406 is an object of object type D. Configurable object 408 is an object of object type A. Any number of types of configurable objects are contemplated. In this example, object types B, D, and A have properties of types Prop 1-Prop N. The values for these properties are represented by the values value 1-1-value N-1 for configurable object 404, values value 1-2-value N-2 for configurable object 406, and values value 1-3-value N-3 for configurable object 408. One or more of the values of a configurable object 404-408 is a configurable controlling value. In an embodiment, "Prop 2" 412 is the configurable controlling property, and Value 2-1 is its value for configurable object 404. The GUI represented in FIG. 4 enables a user to efficiently configure the configurable attributes of complex configurable objects and convey those attributes or entire configured items to the configuration engine for processing and storage in the data store 208.

In an embodiment, the object configuration GUI 410 represents three configurable objects, configurable object 404, configurable object 406, and configurable object 408, being configured for a single client or customer, and the object configuration GUI 410 may be just one element in a larger GUI (such as a web page, a dialog box, an application window, a mobile device app screen, etc.) that comprises other GUI elements, as well.

In some embodiments, any of the properties, Prop 1-Prop N, could represent a property common to all objects in the table, such as a unique object identifier, an object name, an object description, etc.

Figure 5A:
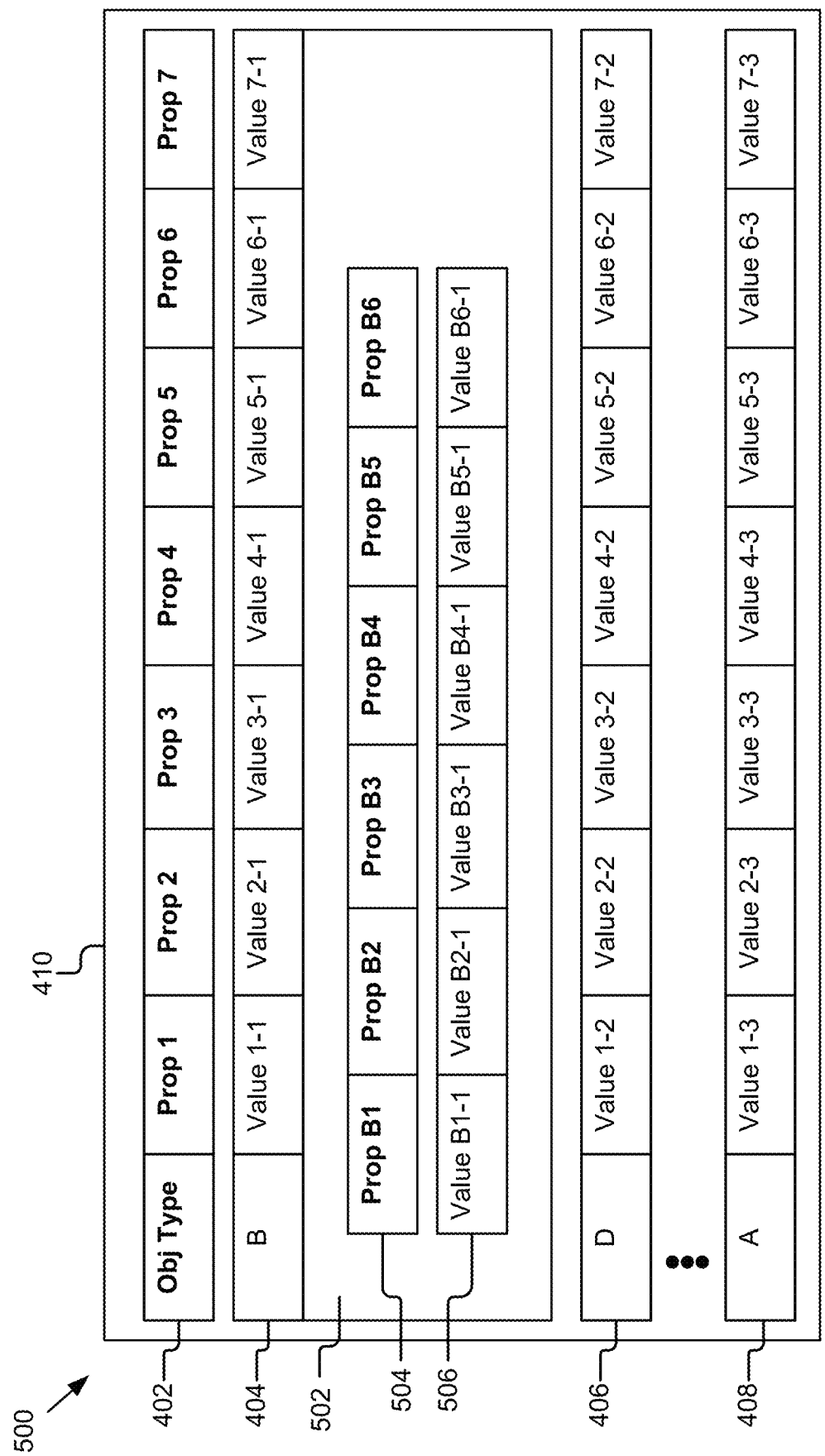
FIG. 5A is a schematic of an example object configuration GUI with additional properties displayed for a selected configurable object.

FIG. 5A illustrates the object configuration GUI 410 of FIG. 4. In this figure, a user selects a configurable object 404, via user input, by default, or some other selection criteria. When the configurable object 404 is selected, the GUI renderer 256 opens up a nested content region 502 underneath the common properties of configurable object 404. In other embodiments, the nested content region 502 may open in a different position relative to its associated configurable object 404, such as to the side of it, above it, etc. In some embodiments, the nested content region 502 comprises additional property labels 504 and corresponding additional property values 506. These additional property values 506, values value B1-1-value B6-1 are values of properties associated with objects of object type B but which are not necessarily associated with objects of another object type. It is contemplated that there could be any number of values such as value B1-1 associated with objects of a given object type but which are not necessarily associated with objects of another object type. In some embodiments, some of the additional values may also be associated with some objects of one or more other object types.

Figure 5B:
FIG. 5B is a schematic of an example object configuration GUI with summary properties and additional properties displayed for a selected configurable object.

FIG. 5B is an object configuration GUI 530 with the same elements of object configuration GUI 500 in FIG. 5A with a few additional elements. The nested content region 502 comprises, in addition to the additional property labels 504 and corresponding additional property values 506, the summary property labels 508 and corresponding summary property values 510. In some embodiments, these summary elements would display meaningful values calculated by the configuration engine 124 or the configuration application 122 using some of the other fields of the configurable object 404. In some embodiments, these summary elements may summarize broader characteristic of the object being represented by the object configuration GUI 410, perhaps, in some embodiments, in conjunction with the configurable object 404. For example, summary value B1-1 might represent a count of objects of this type ordered in the last 12 months, a count of how many configurable objects of this type are being ordered, a price for this object, a discount on this object, an extended price for the objects, etc.

In some embodiments, configurable objects may have nested configurable controlling properties managed by the property manager 254. For example, in the embodiment illustrated, Prop B1 is also a configurable controlling property with a value of value B1-1. For configurable objects with a configurable controlling property value of value B1-1, another set of fields, specific to that value, could be revealed. Here that set of fields is shown with a label of "Prop B7" 512 having a value of "value B7-1" 514. It is to be understood that there could be any number of additional fields shown along with Prop B7. It is also to be understood that can be any number of nested configurable controlling properties associated with a configurable object. In an embodiment, each nested level of additional fields could be shown or hidden separately. In an embodiment, hiding a level would hide all associated properties at that level and all levels below that level.

Figure 5C:
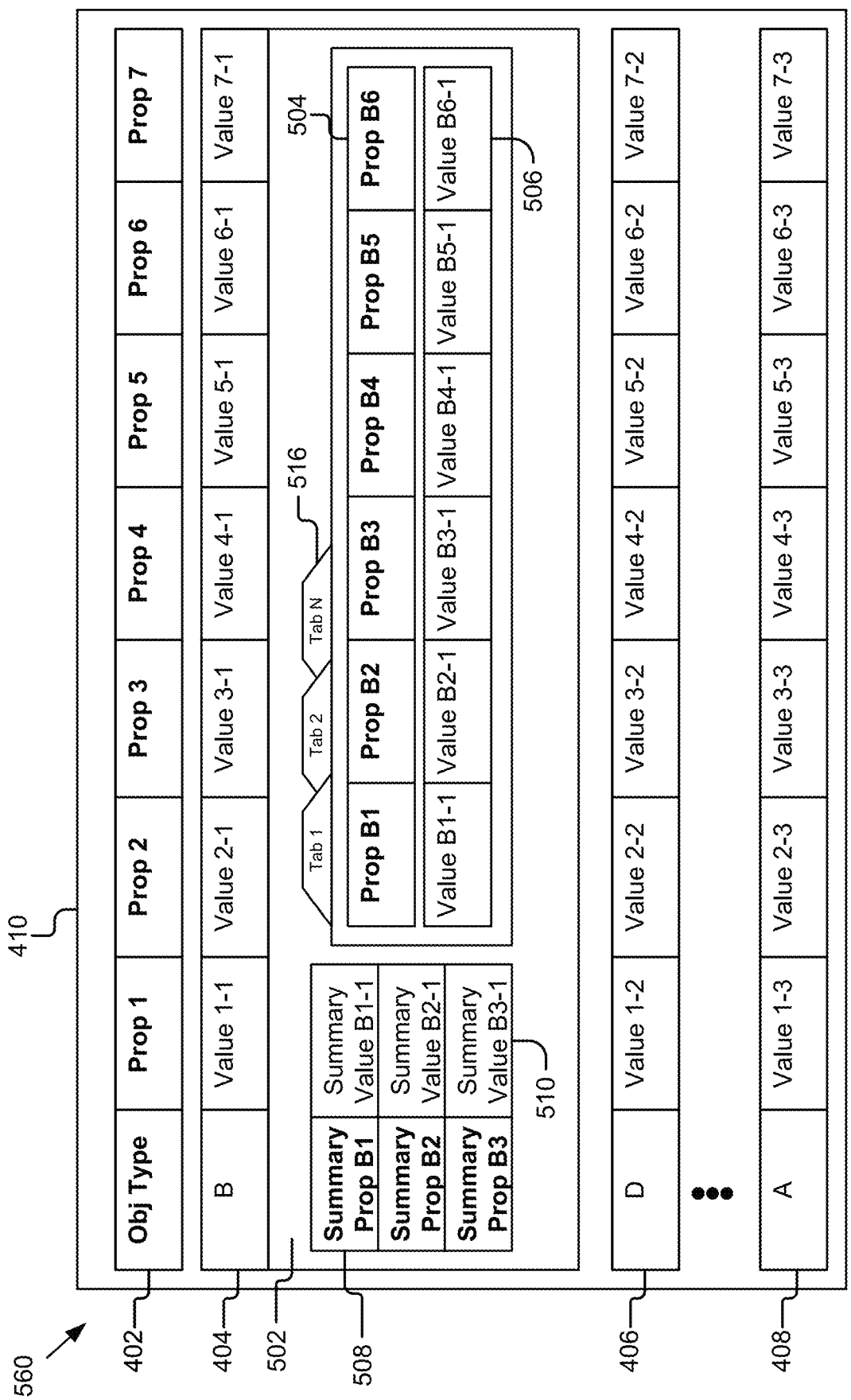
FIG. 5C is a schematic of an example object configuration GUI with summary properties and additional properties for a selected configurable object displayed in an alternate layout.

FIG. 5C is an object configuration GUI 560, generated by the GUI Layout manager 278 or displayed by the GUI renderer 256, with the same elements of object configuration GUI 530 in FIG. 5B with an alternate layout. The nested content region 502 comprises the summary elements 508 and 510 to the left of the additional property labels 504 and corresponding additional property values 506. In addition, the summary property labels 508 and corresponding summary property values 510 are laid out in a columnar layout, rather than in rows as in FIG. 5B. Other embodiments are possible with other layouts, including the additional property labels 504 and corresponding additional property values 506 organized into columns, with or without the summary elements 508 and 510 in columnar layout. Other embodiments with layouts other than rows and/or columns are also contemplated. In some embodiments, layout with fields located proximally according to relevance with one another.

In an embodiment, the additional fields are located within a tabbed pane 516, with some number of tabs, with each tab associated with a configurable controlling property, such as the tabs labeled "Tab 1," Tab 2," through "Tab N." For example, in the embodiment shown, "Tab 1" is selected and shows fields "Prop B1" through "Prop B6." "Tab 2" would show another set of fields, if selected. Various permutations of additional fields and tabs are contemplated. Some of the fields may be the same as those displayed under "Tab 1," or none of the fields may be the same, depending on the configurable controlling property.

Figure 5D:
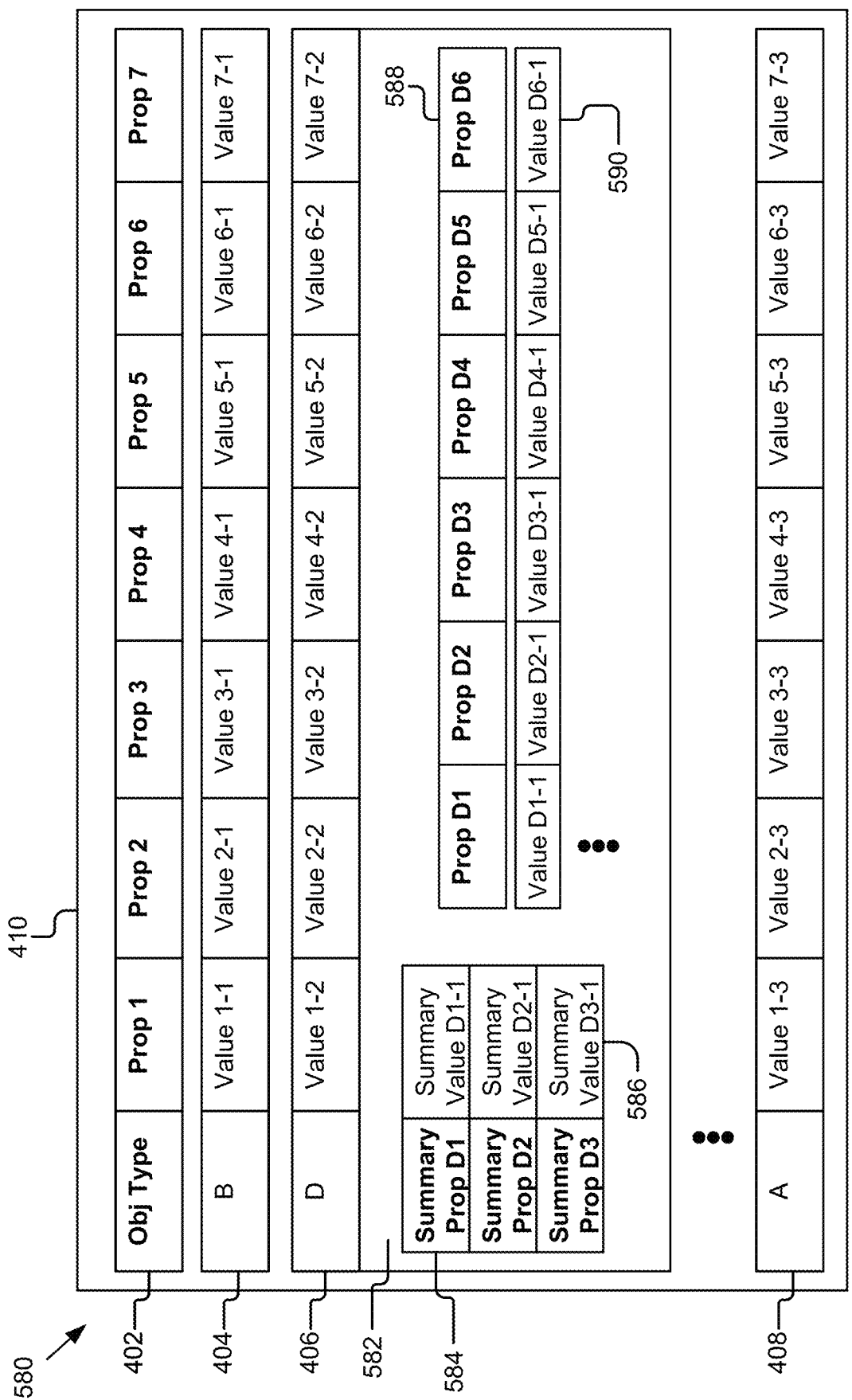
FIG. 5D is a schematic of an example object configuration GUI with summary properties and additional properties for a second selected configurable object.

FIG. 5D is an object configuration GUI 580, generated by the GUI renderer 256 or GUI layout manager 278, with similar elements of object configuration GUI 530 in FIG. 5B with the alternate layout of object configuration GUI 560 in FIG. 5C. However, in object configuration GUI 580, a different configurable object 406 has been selected, and nested content region 582 is now positioned relative to configurable object 406, and contains the summary property labels 584 for the configurable object 406 of object type D, corresponding summary property values 586, the additional property labels 588 for the configurable object 406 of object type D, and corresponding additional property values 590. Any number of additional fields and sets of additional fields, for nested configurable controlling properties, are contemplated.

Figure 6A:
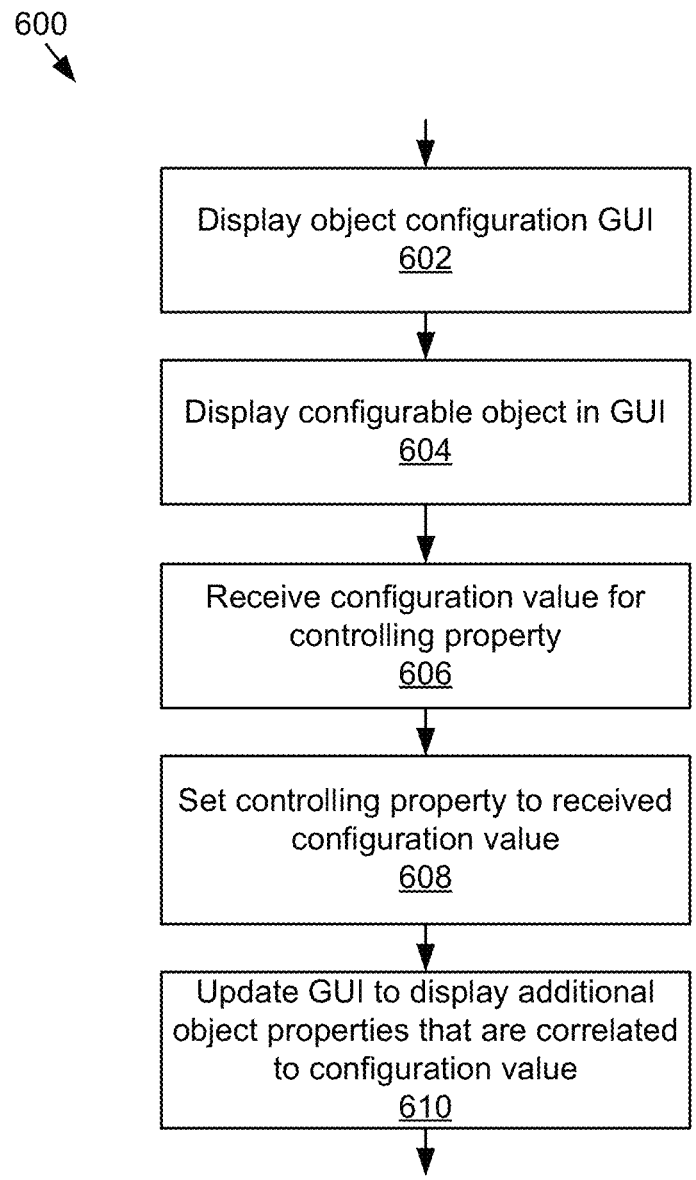
FIG. 6A is a flowchart of an example method for displaying an object configuration GUI.

FIG. 6A represents a method 600 executed by configuration application 122 to display 602 an object configuration GUI 410, and display 604 at least one configurable object 404 in the object configuration GUI 410. At some point, the configuration application 122 receives a configuration value 606 for a controlling property 412 for the configurable object of operation 604. The configuration application 122 may receive the value by direct input from the user 112 or from a database, a server-side configuration engine 124, etc. Once received, the configuration application 122 or a supporting configuration engine 124 on the same device or a networked device sets 608 the controlling property to the received value. Then the configuration application 122 updates 610 the GUI to display additional object properties 506 that are correlated to the configuration value 412. In some embodiments, this may happen automatically. In other embodiments, the update may take some type of user interaction, such as setting a preference for a default behavior, clicking on an expand control in the GUI, selecting the configurable object in the GUI, etc. The configurable attributes of the configurable objects represented in the GUI are processed by the property manager 254 to update the in-memory models and the models in the data store 208. The process can be iterative and repeated until all values are adequately configured.

Figure 6B:
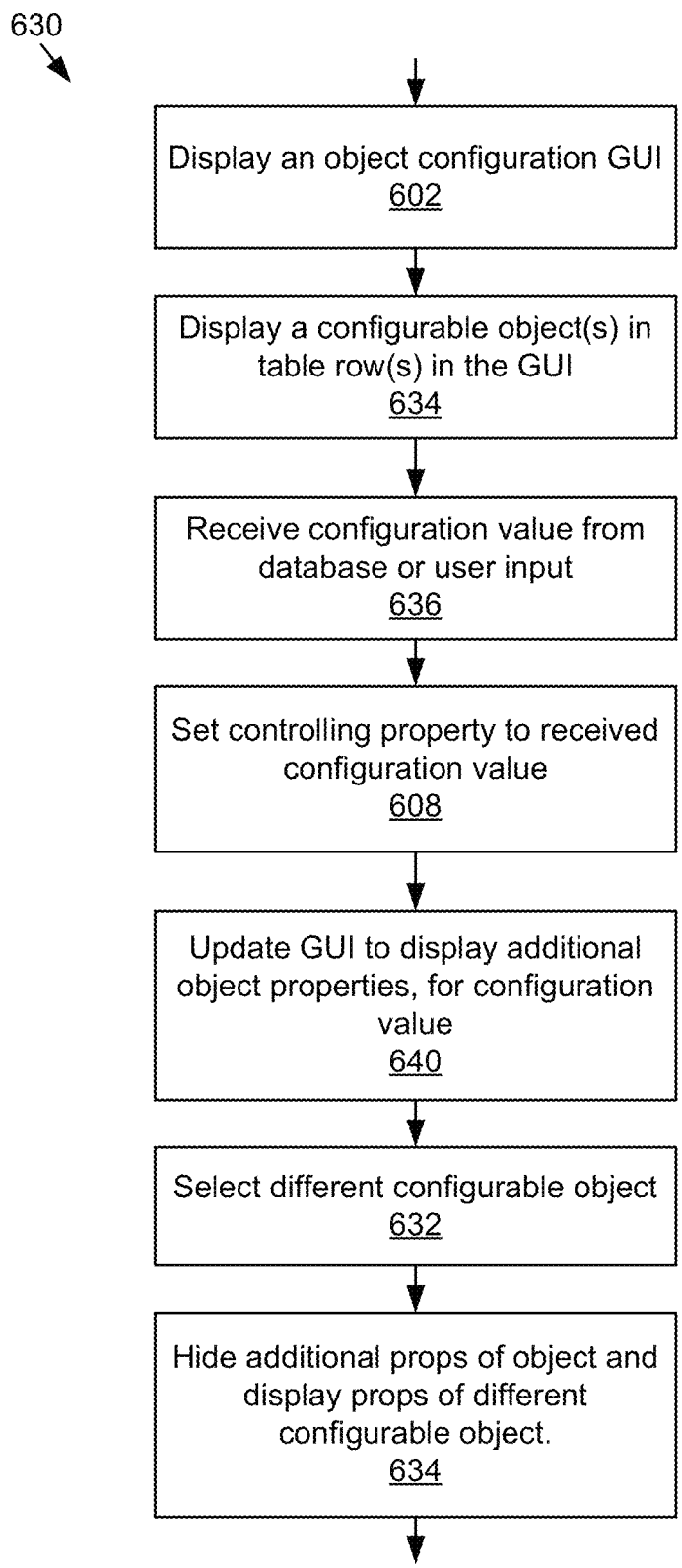
FIG. 6B is a flowchart of an example method for displaying an object configuration GUI and updating it when a second configurable object is selected.

FIG. 6B represents another possible embodiment of the method 600 in a method 630. In this method 630, a configuration application 122 that displays 602 an object configuration GUI and displays 634 at least one configurable object as a row (or part of a row) in a table in the object configuration GUI. At some point, the configuration application 122 receives 636 a configuration value for a controlling property for the configurable object of operation 604, from a database or from user input. The configuration application 122 may receive the value by direct input from the user 112 or from a database, a server-side configuration engine 124, etc. Once received, the configuration application 122 or a supporting configuration engine 124 on the same device or a networked device sets the controlling property to the received value from operation 608. Then the configuration application 122 updates 640 the GUI to display additional object properties that are correlated to the configuration value 412 in a sub-table near the configurable object. In some embodiments, this may happen by default. In other embodiments, the update may take some type of user interaction, such as setting a preference for a default behavior, clicking on an expand control in the GUI, selecting the configurable object in the GUI, etc. Responsive to some input, a user click, for example, a second configurable object is selected 632. In some embodiments, but not necessarily all embodiments, the configuration application 122 hides 634 the additional properties of the original configurable object, and displays 634 the properties of the second (newly selected) configurable object 634. The configurable attributes of the configurable objects represented in the GUI are processed by the property manager 254 to update the in-memory models and the models in the data store 208.

Figure 6C:
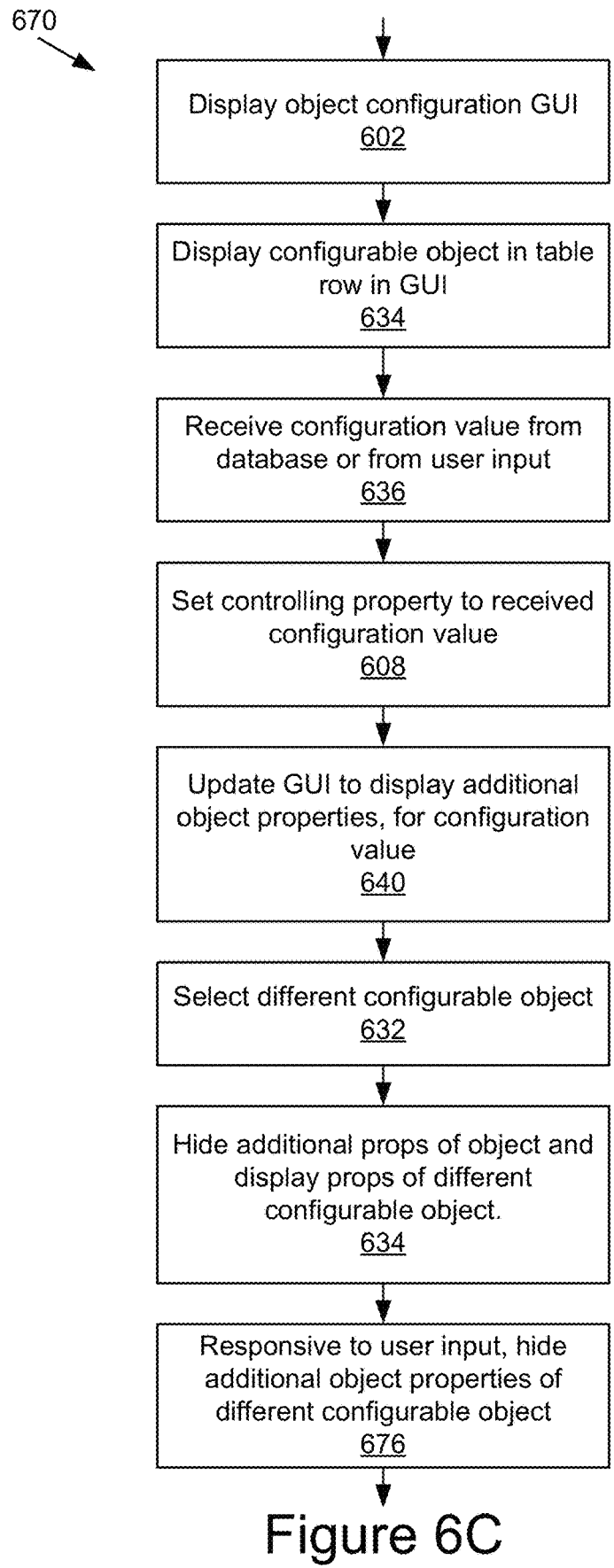
FIG. 6C is a flowchart of an example method for displaying an object configuration GUI, updating it when a second configurable object is selected, and hiding the additional properties.

FIG. 6C represents another possible embodiment of the method 630 in a method 670. In this method 670, a configuration application 122 that displays 602 an object configuration GUI and displays 634 at least one configurable object as a row (or part of a row) in a table in the object configuration GUI. At some point, the configuration application 122 receives 636 a configuration value for a controlling property for the configurable object of operation 604, from a database or from user input. The configuration application 122 may receive the value by direct input from the user 112 or from a database, a server-side configuration engine 124, etc. Once received, the configuration application 122 or a supporting configuration engine 124 on the same device or a networked device sets the controlling property to the received value from operation 608. Then the configuration application 122 updates 640 the GUI to display additional object properties that are correlated to the configuration value 412 in a sub-table near the configurable object. In some embodiments, this may happen by default. In other embodiments, the update may take some type of user interaction, such as setting a preference for a default behavior, clicking on an expand control in the GUI, selecting the configurable object in the GUI, etc. In some embodiments, responsive to some input, a user click, for example, a second configurable object is selected 632. In some embodiments, but not necessarily all embodiments, the configuration application 122 hides 634 the additional properties of the original configurable object, and displays 634 the properties of the second (newly selected) configurable object 634. In some embodiments, with or without operations 632 and 634, responsive to user input, such as a click on an expand/collapse user interface control element, hide 676 the additional object properties of an expanded (displaying the additional properties 506) of the configurable object 404. Again, the configurable attributes of the configurable objects represented in the GUI are processed by the property manager 254 to update the in-memory models and the models in the data store 208.

Figure 7:
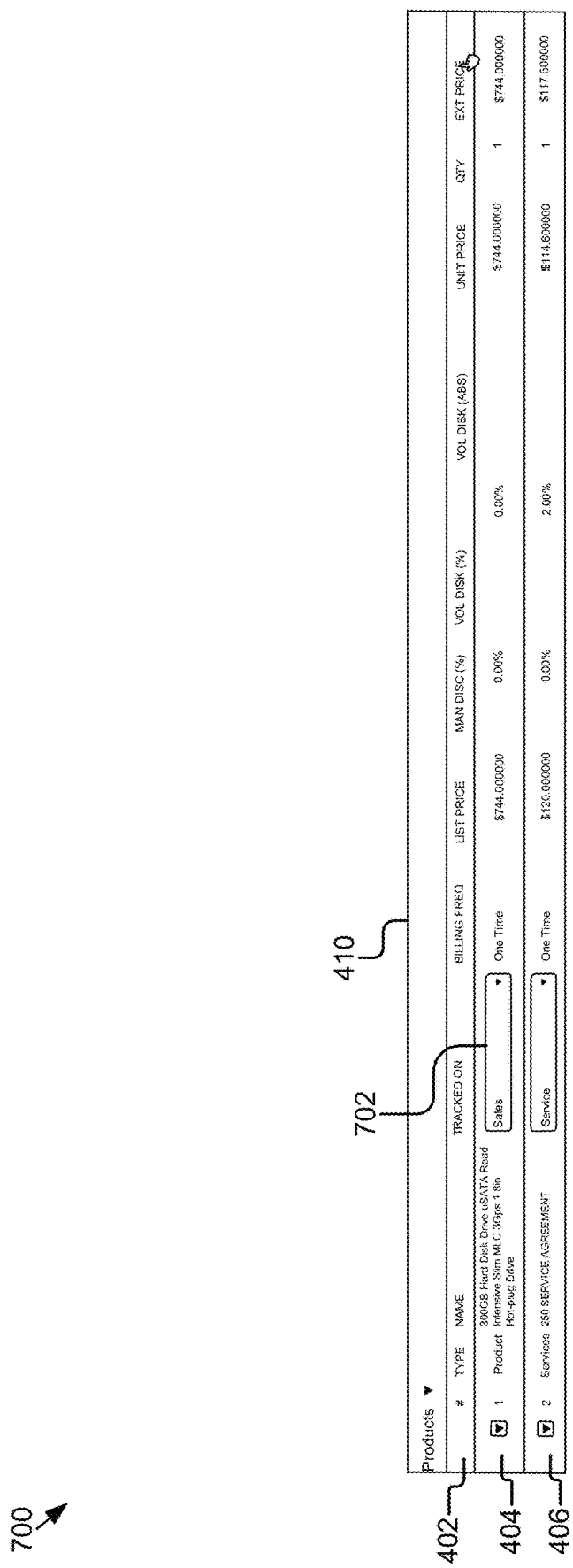
FIG. 7 is an example of an object configuration GUI.

FIG. 7 illustrates an embodiment 700 of the object configuration GUI 410 as a table. Other implementations are contemplated, but not shown, such as a tree or outline structure. In this figure the configurable object property names 402 (column headings) are shown with example text. Likewise, the configurable objects 404 and 406 are shown with example values in each column. The configurable controlling value 412 is shown in a pop-down menu control 702. The configurable controlling value for configurable object 404 is "Sales." The configurable controlling value for configurable object 406 is "Service." Other values are also possible in some embodiments. Other control types for the configurable controlling value field are contemplated, including a text field that allows free-form entry, a text field with autocompletion to values in a predetermined list, and other means of creating or selecting a value in a GUI (radio buttons, etc.).

Figure 8:
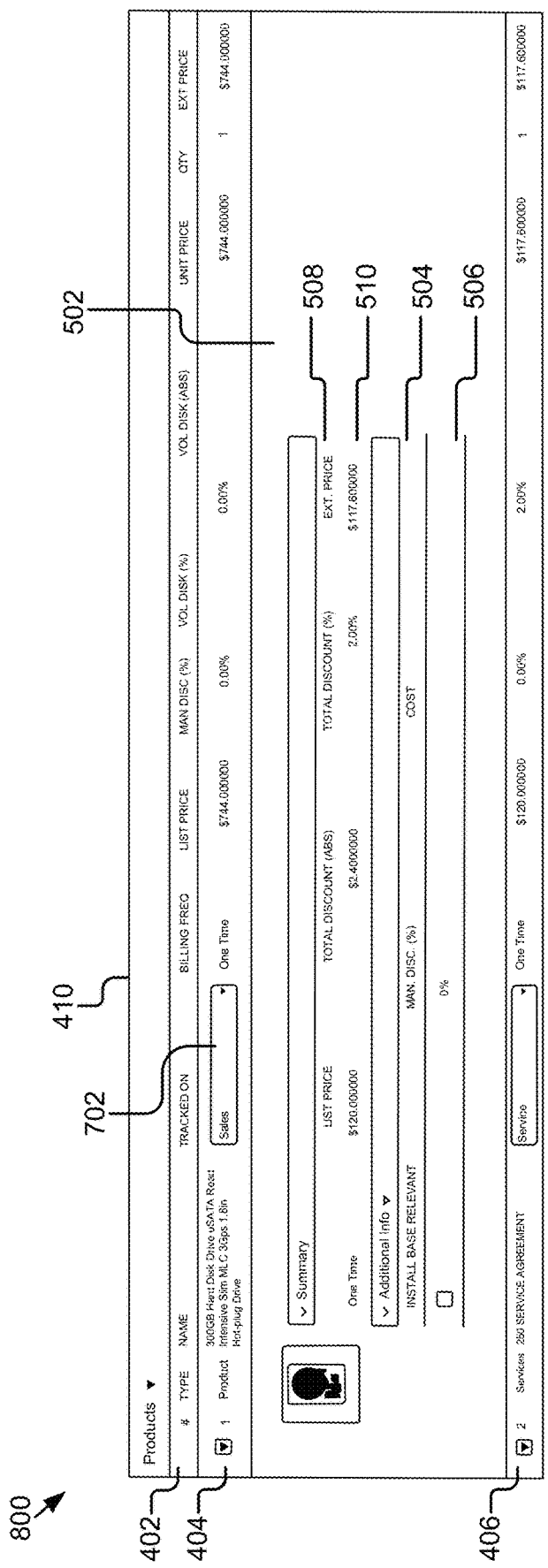
FIG. 8 is an example of an object configuration GUI with additional properties displayed for a selected configurable object.

FIG. 8 illustrates an embodiment 800 of the object configuration GUI 410 as a table with configurable object 404 selected or expanded—which can be the default behavior of selecting a configurable object in some embodiments. In the nested content area 502, summary information 508-510 and additional properties 504-506 are displayed with sample values for an example embodiment of the object configuration GUI 410.

Figure 9:
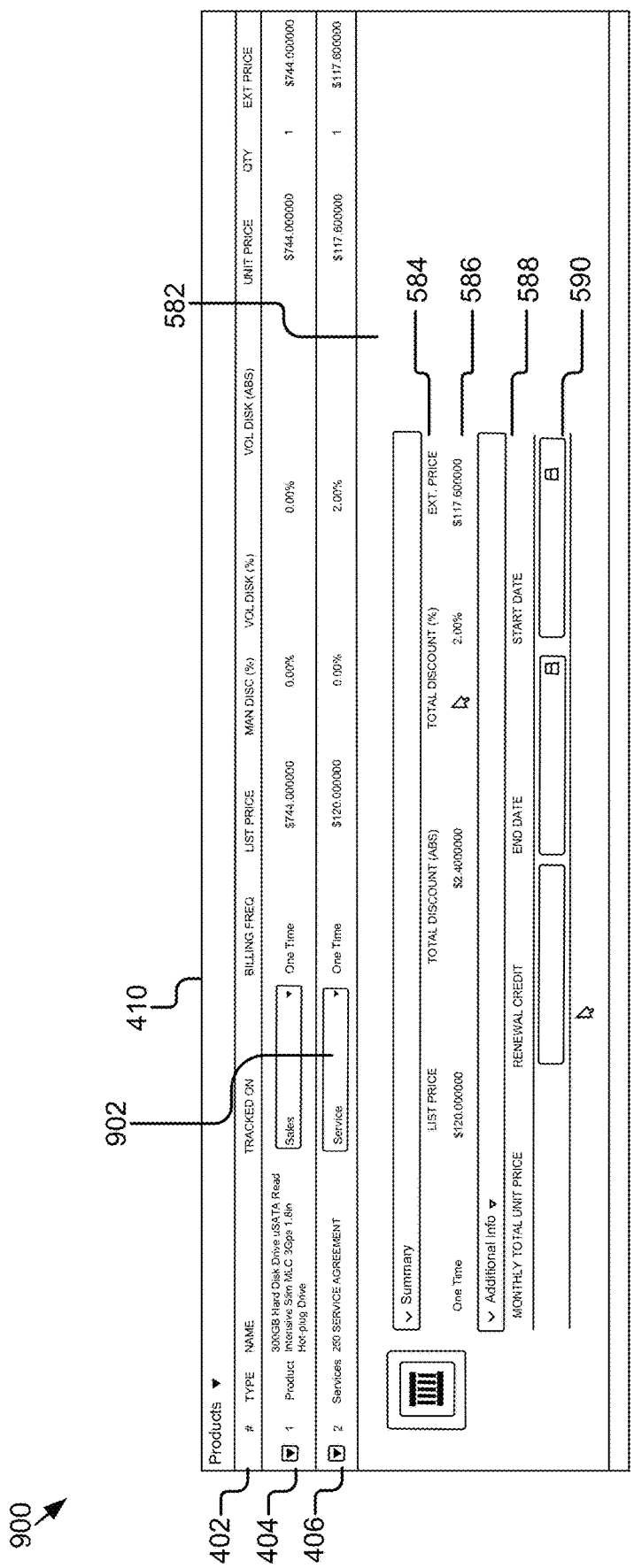
FIG. 9 is an example of an object configuration GUI with summary properties and additional properties displayed for a selected configurable object.

FIG. 9 illustrates an embodiment 900 of the object configuration GUI 410 as a table with a second configurable object 406 selected. In the nested content area 582 of the second configurable object 406, summary information 584-586 and additional properties 588-590 are displayed with sample values for the summary properties and additional properties, respectively, of the second configurable object 406 for an example embodiment of the object configuration GUI 410. In this example, note that the additional properties of configurable object 406 are of a different type and quantity than the additional properties of configurable object 404. In some embodiments, the additional property types 588 may be the same, completely different, or a mix of some the same and some different. The same may be true of the summary property types 584, in some embodiments.

Figure 10:
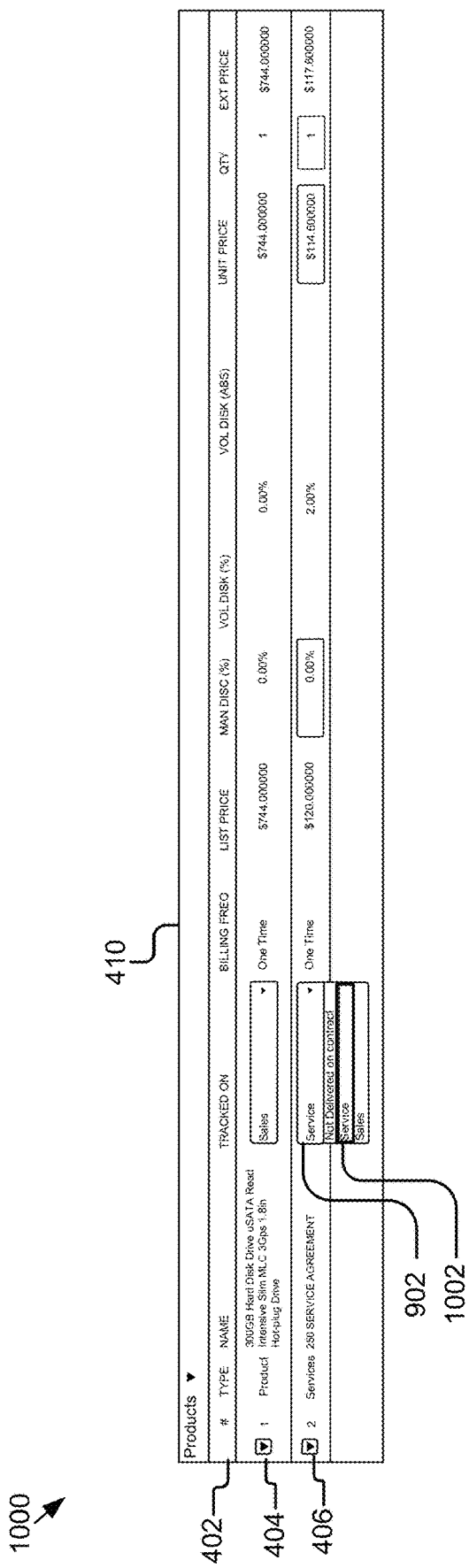
FIG. 10 is an example of an object configuration GUI with the field for the configurable controlling value selected and displaying values for the configurable controlling value.

FIG. 10 illustrates an embodiment 1000 of the object configuration GUI 410 with the GUI element for the configurable controlling value 902 of configurable object 406 (a pop-down menu, in this case) activated so that it displays a list of values for the configurable controlling value for the user to select. In an embodiment, the possible values are "Not Delivered on contract," "Service," and "Sales." Other values are possible in other embodiments. The currently selected value 1002 for the configurable controlling value is "Service" in this example embodiment.

It should be noted that multiple configurable controlling values are possible for a single configurable object. In such a case, each controlling value would associate a set of additional properties with the configurable object. In some embodiments there may be overlap, for example, a first set of additional properties associated with a first controlling value may share some additional properties with a second set of additional properties that are associated with a second controlling value. The multiple controlling values may be multiple values within one property (for example, a group of check boxes, or check-marked menu items) or multiple properties each with a single selected value (for example a group of radio buttons, or an exclusive menu selection where selecting on menu item associated with a controlling value de-selects any previously selected menu item. In some embodiments, the multiple controlling values may be in multiple controlling properties, and there may be a mix of exclusive and non-exclusive values among the multiple controlling properties.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method, comprising:
displaying, on a display device, an object configuration graphical user interface including a set of configurable objects in a content region, a first configurable object in the set of configurable objects having a first set of object properties, a first property in the first set of object properties being a first configurable controlling property, the first configurable controlling property being correlated with a plurality of sets of object properties whose availability are dynamically controlled by the first configurable controlling property;
receiving, at an input device coupled to the display device, a first user input configuring the first configurable controlling property;
setting, responsive to receiving the first user input, the first configurable controlling property to a first configurable value, the first configurable value being correlated with a particular set from the plurality of sets of object properties of the first configurable object; and
updating, responsive to the first user input, the object configuration graphical user interface displayed on the display device to depict a second set of object properties based on the first configurable controlling property of the first configurable object in a nested position that is visually differently adjacent to the first configurable object than in a linear row with the first configurable object.

2. The computer-implemented method of claim 1, wherein the set of configurable objects comprises a table with a row in the table representing the first configurable object.

3. The computer-implemented method of claim 1, wherein the position is within an expanded content area of the first configurable object, and below the first set of object properties of the first configurable object.

4. The computer-implemented method of claim 1, wherein, responsive to a second user input, the second set of object properties is hidden.

5. The computer-implemented method of claim 1, wherein the first user input is a user input from among the following:
selection of the first configurable value from a list of available values for the first configurable value; and
typing a typed value for the first configurable value, the typed value matching a member of the list of available values for the first configurable value.

6. The computer-implemented method of claim 1, further comprising:
hiding, responsive to a third user input, the second set of object properties of the first configurable object in the object configuration graphical user interface; and
displaying, responsive to the third user input, a third set of object properties, the third set of object properties being associated with a second configurable object.

7. The computer-implemented method of claim 6, wherein the third user input comprises selection of the second configurable object.

8. A system comprising:
one or more processors;
one or more data stores, wherein the one or more data stores are communicatively coupled to the one or more processors, the one or more data stores configured to store instructions, which when executed by the one or more processors include:
displaying, on a display device, an object configuration graphical user interface including a set of configurable objects in a content region, a first configurable object in the set of configurable objects having a first set of object properties, a first property in the first set of object properties being a first configurable controlling property, the first configurable controlling property being correlated with a plurality of sets of object properties whose availability are dynamically controlled by the first configurable controlling property;
receiving, at an input device coupled to the display device, a first user input configuring the first configurable controlling property;
setting, responsive to receiving the first user input, the first configurable controlling property to a first configurable value, the first configurable value being correlated with a particular set from the plurality of sets of object properties of the first configurable object; and
updating, responsive to the first user input, the object configuration graphical user interface displayed, on the display device, a second set of object properties based on the first configurable controlling property that is a set from the plurality of sets of object properties, in a nested position that is visually differently adjacent to the first configurable object than in a linear row with the first configurable object.

9. The system of claim 8 wherein the set of configurable objects comprises a table with a row in the table representing the first configurable object.

10. The system of claim 8, wherein the position is within an expanded content area of the first configurable object, and below the first set of object properties of the first configurable object.

11. The system of claim 8, wherein, responsive to a second user input, the second set of object properties is hidden.

12. The system of claim 8, wherein the first user input is a user input from among the following:
selection of the first configurable value from a list of available values for the first configurable value; and
typing a typed value for the first configurable value, the typed value matching a member of the list of available values for the first configurable value.

13. The system of claim 8, further comprising:
hiding, responsive to a third user input, the second set of object properties of the first configurable object in the object configuration graphical user interface; and
displaying, responsive to the third user input, a third set of object properties, the third set of object properties being associated with a second configurable object.

14. The system of claim 13, wherein the third user input comprises selection of the second configurable object.

15. A system comprising:
means for displaying an object configuration graphical user interface including a set of configurable objects in a content region, a first configurable object in the set of configurable objects having a first set of object properties, a first property in the first set of object properties being a first configurable controlling property, the first configurable controlling property being correlated with a plurality of sets of object properties whose availability are dynamically controlled by the first configurable controlling property;

means for receiving a first user input configuring the first configurable controlling property;

means for setting, responsive to receiving the first user input, the first configurable controlling property to a first configurable value, the first configurable value being correlated with a particular set from the plurality of sets of object properties of the first configurable object; and means for updating, responsive to the first user input, the object configuration graphical user interface displayed a second set of object properties based on the first configurable controlling property that is a set from the plurality of sets of object properties, in a nested position that is visually differently adjacent to the first configurable object than in a linear row with the first configurable object.

16. The system of claim 15, wherein the set of configurable objects comprises a table with a row in the table representing the first configurable object.

17. The system of claim 15, wherein the position is within an expanded content area of the first configurable object, and below the first set of object properties of the first configurable object.

18. The system of claim 15, wherein, responsive to a second user input, the second set of object properties is hidden.

19. The system of claim 15, wherein the first user input is a user input from among the following:

selection of the first configurable value from a list of available values for the first configurable value; and typing a typed value for the first configurable value, the typed value matching a member of the list of available values for the first configurable value.

20. The system of claim 15, further comprising:

hiding, responsive to a third user input, the second set of object properties of the first configurable object in the object configuration graphical user interface; and displaying, responsive to the third user input, a third set of object properties, the third set of object properties being associated with a second configurable object.

* * * * *